United States Patent
Jin et al.

(10) Patent No.: US 11,431,384 B2
(45) Date of Patent: Aug. 30, 2022

(54) CHANNEL ESTIMATION METHOD AND APPARATUS

(71) Applicant: HUAWEI TECHNOLOGIES CO., LTD., Guangdong (CN)

(72) Inventors: Huangping Jin, Shanghai (CN); Xiaohan Wang, Shanghai (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/157,318

(22) Filed: Jan. 25, 2021

(65) Prior Publication Data

US 2021/0175936 A1 Jun. 10, 2021

Related U.S. Application Data

(63) Continuation of application No. PCT/CN2019/096179, filed on Jul. 16, 2019.

(30) Foreign Application Priority Data

Jul. 26, 2018 (CN) .......................... 201810840729.8

(51) Int. Cl.
*H04B 7/0417* (2017.01)
*H04B 7/0456* (2017.01)
(Continued)

(52) U.S. Cl.
CPC ........... *H04B 7/0417* (2013.01); *H04B 7/046* (2013.01); *H04B 7/0634* (2013.01); *H04L 25/0204* (2013.01)

(58) Field of Classification Search
CPC .................................................. H04B 7/0417
(Continued)

(56) References Cited

U.S. PATENT DOCUMENTS 4,403,331 A * 9/1983 Halpern .............. H04L 27/3411
370/208
2017/0070273 A1 3/2017 Lee et al.
(Continued)

FOREIGN PATENT DOCUMENTS

CN 105871504 A 8/2016
CN 106452697 A 2/2017
(Continued)

OTHER PUBLICATIONS

Extended European Search Report issued in European Application No. 19840238.0 dated Jul. 9, 2021, 8 pages.
(Continued)

*Primary Examiner* — Lihong Yu
(74) *Attorney, Agent, or Firm* — Fish & Richardson P.C.

(57) ABSTRACT

Embodiments of this application disclose a channel estimation method and apparatus, and relate to the field of communications technologies. The method may include: generating and sending indication information, where the indication information is used to indicate L space-frequency basis vectors for constructing an M×N-dimensional space-frequency vector; the space-frequency vector includes M N-dimensional precoding vectors, each precoding vector is used in one of M frequency bands, and the space-frequency vector is generated by performing a weighted combination on L space-frequency component vectors; each of the L space-frequency component vectors is a vector including M×N elements that are in one of the L space-frequency basis vectors, and each of the L space-frequency basis vectors is an $N_f$×N-dimensional vector; the space-frequency basis vector is a three-dimensional oversampled (DFT) vector; and $L \geq 2$, $N_f \geq M \geq 1$, $N \geq 2$, and L, M, N, and $N_f$ are all integers.

20 Claims, 8 Drawing Sheets

(51) Int. Cl.
*H04B 7/06* (2006.01)
*H04L 25/02* (2006.01)

(58) Field of Classification Search
USPC .......................................................... 375/267
See application file for complete search history.

(56) References Cited

U.S. PATENT DOCUMENTS

| | | | |
|---|---|---|---|
| 2017/0251517 | A1 | 8/2017 | Kimura et al. |
| 2017/0302353 | A1 | 10/2017 | Rahman et al. |
| 2019/0020386 | A1* | 1/2019 | Park .................... H04B 7/0417 |

FOREIGN PATENT DOCUMENTS

| | | |
|---|---|---|
| CN | 107171702 A | 9/2017 |
| CN | 108076518 A | 5/2018 |

OTHER PUBLICATIONS

Huawei et al., "Further enhancements on CSI reporting and codebook design," 3GPP TSG RAN WG1 Meeting #93, R1-1807128, Busan, Korea, May 21-25, 2018, 6 pages.
Huawei et al., "Further enhancements on CSI reporting and codebook design," 3GPP TSG RAN WG1 Meeting #92, R1-1802074, Athens, Greece, Feb. 26-Mar. 2, 2018, 5 pages.
Samsung, "Remaining issues of NR-PBCH," 3GPP TSG RAN WG1 #89, R1-1707929, Hangzhou, P.R. China, May 15-19, 2017, 8 pages.
3GPP TS 38.212 V15.2.0 (Jun. 2018), "3rd Generation Partnership Project;Technical Specification Group Radio Access Network;NR;Multiplexing and channel coding(Release 15)," Jun. 2018, 98 pages.
3GPP TS 38.214 V15.2.0 (Jun. 2018), "3rd Generation Partnership Project; Technical Specification Group Radio Access Network; NR; Physical layer procedures for data (Release 15)," Jun. 2018, 95 pages.
Office Action issued in Chinese Application No. 201810840729.8 dated Aug. 27, 2020, 5 pages.
PCT International Search Report and Written Opinion issued in International Application No. PCT/CN2019/096179 dated Sep. 29, 2019, 15 pages (with English translation).

* cited by examiner

CHANNEL ESTIMATION METHOD AND APPARATUS

CROSS-REFERENCE TO RELATED APPLICATIONS

This application is a continuation of International Application No. PCT/CN2019/096179, filed on Jul. 16, 2019, which claims priority to Chinese Patent Application No. 201810840729.8, filed on Jul. 26, 2018. The disclosures of the aforementioned applications are hereby incorporated by reference in their entireties.

TECHNICAL FIELD

Embodiments of this application relate to the field of communications technologies, and in particular, to a channel estimation method and apparatus.

BACKGROUND

Emergence of a multiple-input multiple-output (MIMO) technology brings revolutionary changes to wireless communications. A plurality of antennas are deployed on a transmit end device and a receive end device, so that the MIMO technology can significantly improve performance of a wireless communications system. For example, in a diversity scenario, the MIMO technology can effectively improve transmission reliability; and in a multiplexing scenario, the MIMO technology can greatly improve a transmission throughput.

A MIMO system usually uses a precoding technology to enhance a channel, so as to improve a spatial multiplexing effect. The precoding technology uses a precoding matrix matching the channel to process a spatially multiplexed data stream (spatial stream for short below), so as to implement channel precoding and improve receiving quality of the spatial stream.

Each spatial stream on which spatial multiplexing is performed corresponds to one column vector of the precoding matrix. In a precoding process, the transmit end device precodes the spatial stream by using the column vector. Therefore, the foregoing column vector may also be referred to as a precoding vector. The precoding vector may be determined by the receive end device based on a space domain component vector set, and indicated to the transmit end device. The space domain component vector set is a set including a series of space domain component vectors, and each space domain component vector corresponds to one beam direction of the transmit end device. One space domain component vector most matching the channel, or a weighted sum of a plurality of space domain component vectors may be used as a precoding vector, or the precoding vector is adjusted (for example, but not limited to, reconstructed), and an adjusted precoding vector is used for precoding. Usually, there may be a plurality of spatial streams on which spatial multiplexing is performed, and precoding vectors of the spatial streams correspond to column vectors of the precoding matrix.

The foregoing precoding vector is usually a precoding vector used to precode a spatial stream in one frequency band. The receive end device usually needs to indicate, to the transmit end device, precoding vectors corresponding to a plurality of frequency bands, and a precoding vector corresponding to each frequency band is independently indicated. Consequently, indication overheads are relatively high.

SUMMARY

Embodiments of this application provide a channel estimation method and apparatus, to help reduce indication overheads.

According to one aspect, an embodiment of this application provides a channel estimation method. The method may include: generating and sending indication information. The indication information is used to indicate L space-frequency basis vectors for constructing an M×N-dimensional space-frequency vector. The space-frequency vector includes M N-dimensional precoding vectors, each precoding vector is used in one of M frequency bands, and the space-frequency vector is generated by performing a weighted combination on L space-frequency component vectors. Each of the L space-frequency component vectors is a vector including M×N elements that are in one of the L space-frequency basis vectors, and each of the L space-frequency basis vectors is a $N_f$×N-dimensional vector. The space-frequency basis vector is a three-dimensional oversampled discrete Fourier transform DFT vector. $L≥2$, $N_f≥M≥1$, $N≥2$, and $L$, $M$, $N$, and $N_f$ are all integers. The technical solution may be performed by a receive end device (for example, a terminal).

Each of the M N-dimensional precoding vectors may be a precoding vector based on which a single spatial stream is transmitted in each of the M frequency bands. Three-dimensional oversampling refers to oversampling at least one of "two dimensions of a space domain characteristic and one dimension of a frequency domain characteristic". Optionally. M may be a quantity of frequency bands corresponding to channel information fed back by the receive end device, and the quantity is indicated by a transmit end device. It is clear that, this embodiment of this application is not limited thereto. Optionally, $N_f$ may be a quantity of frequency bands included in available bandwidth configured by the transmit end device for the receive end device.

Because the M N-dimensional precoding vectors may form a space-frequency vector, and the space-frequency vector is generated by performing a weighted combination on a plurality of space-frequency component vectors, a condition may be created for reducing indication overheads of the precoding vectors. For example, the M N-dimensional precoding vectors may be indicated by indicating the space-frequency vector. Further, the space-frequency vector may be indicated by indicating the plurality of space-frequency component vectors. Furthermore, the plurality of space-frequency component vectors may be indicated by constructing a plurality of space-frequency basis vectors of the plurality of space-frequency component vectors. Therefore, compared with the conventional technical solution of independently indicating a precoding vector corresponding to each frequency band, the technical solution provided in this embodiment of this application helps reduce the indication overheads. In addition, the foregoing technical solution further provides specific representation forms of the plurality of space-frequency basis vectors. To be specific, each space-frequency basis vector is a three-dimensional oversampled DFT vector. In this way, the space-frequency basis vector can be compatible with an existing type II codebook type, so that an implementation of the terminal is simple.

In one embodiment, the method further includes: receiving first configuration information, where the first configuration information is used to configure $N_f$.

For example, the first configuration information includes a value of $N_f$. Alternatively, the first configuration information includes available bandwidth and a frequency band size. Alternatively, the first configuration information includes a length of signaling used to indicate a frequency band location reported in channel state information.

The first configuration information may be radio resource control (RRC) signaling or medium access control (MAC) signaling. It is clear that, this embodiment of this application is not limited thereto.

In addition, $N_f$ may alternatively be a preset value.

In one embodiment, the method further includes: receiving second configuration information, where the second configuration information is used to configure a codebook type in a candidate codebook type set. In this case, the generating indication information includes: generating the indication information based on the codebook type that is configured by using the second configuration information.

For example, the second configuration information may be RRC signaling or MAC signaling. It is clear that, this embodiment of this application is not limited thereto.

The candidate codebook type set may include at least two codebook types. The second configuration information is used to configure a codebook type that is included in the candidate codebook type set and that is constructed based on the space-frequency basis vector provided in this embodiment of this application.

In addition, the codebook type constructed based on the space-frequency basis vector provided in this embodiment of this application may alternatively be preset.

According to another aspect, an embodiment of this application provides a channel estimation method. The method may include: receiving indication information, and determining, based on the indication information, L space-frequency basis vectors for constructing an M×N-dimensional space-frequency vector. The indication information is used to indicate the L space-frequency basis vectors. The space-frequency vector includes M N-dimensional precoding vectors, each precoding vector is used in one of M frequency bands, and the space-frequency vector is generated by performing a weighted combination on L space-frequency component vectors. Each of the L space-frequency component vectors is a vector including M×N elements that are in one of the L space-frequency basis vectors, and each of the L space-frequency basis vectors is a $N_f$×N-dimensional vector. The space-frequency basis vector is a three-dimensional oversampled discrete Fourier transform DFT vector. L≥2, $N_f$≥M≥1, N≥2, and L, M, N, and $N_f$ are all integers. The technical solution may be performed by a transmit end device (for example, a network device). For beneficial effects that can be achieved by using the method, refer to the first aspect. Details are not described herein again.

In one embodiment, the method may further include: sending first configuration information, where the first configuration information is used to configure $N_f$. For example, the first configuration information includes a value of $N_f$; or available bandwidth and a frequency band size; or a length of signaling used to indicate a frequency band location reported in channel state information. In addition, $N_f$ may alternatively be a preset value.

In one embodiment, the method may further include: sending second configuration information, where the second configuration information is used to configure a codebook type in a candidate codebook type set; and indication information is generated based on the codebook type that is configured by using the second configuration information.

Based on any technical solution provided in both aspects, the following provides several embodiments.

In one embodiment, each space-frequency basis vector is selected from a space-frequency basis vector set.

In one embodiment, the space-frequency basis vector set includes at least two space-frequency basis vector subsets, and any two space-frequency basis vectors included in each space-frequency basis vector subset are orthogonal to each other. The L space-frequency basis vectors are selected from one of the at least two space-frequency basis vector subsets. The possible design provides a specific implementation of a space-frequency basis vector set. It is clear that, this embodiment of this application is not limited thereto.

In one embodiment, the indication information is used to indicate the space-frequency basis vector subset from which the L space-frequency basis vectors are selected, and indexes of the L space-frequency basis vectors in the space-frequency basis vector subset. In this way, indication overheads can be reduced.

In one embodiment, the indication information is used to indicate each space domain index in a space domain index set and each frequency domain index in a frequency domain index set. In this way, the indication overheads can be reduced. The possible design may be used in any one of the following scenarios: The space domain index set includes one space domain index; or the frequency domain index set includes one frequency domain index; or each space domain index included in the space domain index set corresponds to a same frequency domain index; or each frequency domain index included in the frequency domain index set corresponds to a same space domain index. Optionally, the indication information is further used to indicate at least a quantity of space domain indexes included in the space domain index set or a quantity of frequency domain indexes included in the frequency domain index set.

In one embodiment, the indication information is used to indicate each space domain index in a space domain index set and a frequency domain index corresponding to the space domain index. The possible design may be used in a scenario in which at least two space domain indexes included in the space domain index set correspond to different frequency domain indexes, and in particular, may be used in a scenario in which at least two space domain indexes included in the space domain index set correspond to different frequency domain indexes, and the space domain indexes are relatively few (to be specific, space domain sparsity is relatively good). Optionally, the indication information is further used to indicate a quantity of frequency domain indexes corresponding to each space domain index.

In one embodiment, the indication information is used to indicate each frequency domain index in a frequency domain index set and a space domain index corresponding to the frequency domain index. The possible design may be used in a scenario in which at least two frequency domain indexes included in the frequency domain index set correspond to different space domain indexes, and in particular, may be used in a scenario in which at least two frequency domain indexes included in the frequency domain index set correspond to different space domain indexes, and the frequency domain indexes are relatively few (to be specific, frequency domain sparsity is relatively good). Optionally, the indication information is further used to indicate a quantity of space domain indexes corresponding to each frequency domain index.

The space domain index set is a set including a space domain index of each of the L space-frequency basis vectors.

The frequency domain index set is a set including a frequency domain index of each of the L space-frequency basis vectors.

Indexes of the space-frequency basis vector include one space domain index and one frequency domain index.

Optionally, the space domain index of the space-frequency basis vector is used to indicate a space domain basis vector for constructing the space-frequency basis vector, and the frequency domain index of the space-frequency basis vector is used to indicate a frequency domain basis vector for constructing the space-frequency basis vector.

In one embodiment, the indication information includes an index of a combination that is of the L space-frequency basis vectors and that is in a set including combinations of any L space-frequency basis vectors selected from the space-frequency basis vector set. In this way, the indication overheads can be reduced.

In one embodiment, the indication information includes an index of each of the L space-frequency basis vectors in the space-frequency basis vector set.

In one embodiment, each space-frequency basis vector in the space-frequency basis vector set is a Kronecker product of three vectors, and one of the three vectors is an $N_f$-dimensional vector, for example, an $N_f$-dimensional frequency domain basis vector or a variation thereof (for example, transpose, conjugate, or conjugate transpose).

In one embodiment, an element $b_{l,m,s}$ in the space-frequency basis vector set is $$b_{l,m,s} = \left[ v_{l,m}^T \quad e^{j\frac{2\pi s}{O_f N_f}} v_{l,m}^T \quad \ldots \quad e^{j\frac{2\pi s(N_f-1)}{O_f N_f}} v_{l,m}^T \right]^T,$$

where $O_f$ is a preset value, $O_f$ and $N_f$ are positive integers, and $0 \le s \le O_f N_f - 1$, $$v_{l,m} = \left[ u_m \quad e^{j\frac{2\pi l}{O_1 N_1}} u_m \quad \ldots \quad e^{j\frac{2\pi l(N_1-1)}{O_1 N_1}} u_m \right]^T,$$

where $O_1$ and $N_1$ are preset values, $O_1$ and $N_1$ are positive integers, and $0 \le l \le O_1 N_1 - 1$; and $$u_m = \begin{cases} \left[ 1 \quad e^{j\frac{2\pi m}{O_2 N_2}} \quad \ldots \quad e^{j\frac{2\pi m(N_2-1)}{O_2 N_2}} \right] & N_2 > 1 \\ 1 & N_2 = 1 \end{cases},$$

where $O_2$ and $N_2$ are positive integers, and $0 \le m \le O_2 N_2 - 1$.

According to yet another aspect, an embodiment of this application provides a channel estimation apparatus. The channel estimation apparatus may be configured to perform any method provided in the first aspect. The channel estimation apparatus may be a receive end device, for example, a terminal.

In one embodiment, the channel estimation apparatus may be divided into function modules based on the method provided in the first aspect. For example, each function module may be divided based on each corresponding function, or two or more functions may be integrated into one processing module.

In one embodiment, the channel estimation apparatus may include a processor and a transceiver. The processor is configured to generate indication information. The transceiver is configured to send the indication information. For a related description of the indication information, refer to the first aspect.

Optionally, the transceiver is further configured to receive first configuration information, where the first configuration information is used to configure $N_f$.

Optionally, the transceiver is further configured to receive second configuration information, where the second configuration information is used to configure a codebook type in a candidate codebook type set. The processor is configured to generate the indication information based on the codebook type that is configured by using the second configuration information.

According to still another aspect, an embodiment of this application provides a channel estimation apparatus. The channel estimation apparatus may be configured to perform any method provided in the second aspect. The channel estimation apparatus may be a transmit end device, for example, a network device.

In one embodiment, the channel estimation apparatus may be divided into function modules based on the method provided in the second aspect. For example, each function module may be divided based on each corresponding function, or two or more functions may be integrated into one processing module.

In one embodiment, the channel estimation apparatus may include a processor and a transceiver. The transceiver is configured to receive indication information. The processor is configured to determine L space-frequency basis vectors based on the indication information.

Optionally, the transceiver may be further configured to at least: send first configuration information or send second configuration information. For related descriptions of the indication information, the first configuration information, and the second configuration information, refer to the second aspect.

According to another aspect, an embodiment of this application provides a channel estimation apparatus. The channel estimation apparatus may include a memory and a processor. The memory is configured to store a computer program. When the computer program is executed by the processor, any method provided in the first aspect is performed. For example, the apparatus may be a receive end device, for example, a terminal, or may be a chip.

According to yet another aspect, an embodiment of this application provides a channel estimation apparatus. The channel estimation apparatus may include a memory and a processor. The memory is configured to store a computer program. When the computer program is executed by the processor, any method provided in the second aspect is performed. For example, the apparatus may be a transmit end device, for example, a network device, or may be a chip.

According to still another aspect, an embodiment of this application provides a processor. The processor is configured to: generate indication information and output the indication information. For a related description of the indication information, refer to the first aspect.

According to another aspect, an embodiment of this application provides a processor. The processor is configured to: receive input indication information, and determine L space-frequency basis vectors based on the indication information. For related descriptions of the indication information and the L space-frequency basis vectors, refer to the second aspect.

According to yet another aspect, an embodiment of this application provides a processing device, including a transmitter and a processor. The processor is configured to: generate indication information, and transmit the indication information through the transmitter. For a related description of the indication information, refer to the first aspect.

According to still another aspect, an embodiment of this application provides a processing device, including a receiver and a processor. The processor is configured to: receive indication information through the receiver, and determine L space-frequency basis vectors based on the indication information. For related descriptions of the indication information and the L space-frequency basis vectors, refer to the second aspect.

In one embodiment, the processor may be configured to perform, for example, but is not limited to, baseband-related processing, and the receiver and a transmitter may be separately configured to perform, for example, but is not limited to, radio frequency receiving and sending. The foregoing components may be separately disposed on chips that are independent of each other, or at least a part or all of the foregoing components may be disposed on a same chip. For example, the receiver and the transmitter may be disposed on receiver chips and transmitter chips that are independent of each other, or may be integrated into a transceiver and then disposed on a transceiver chip. For another example, the processor may be further divided into an analog baseband processor and a digital baseband processor. The analog baseband processor and the transceiver may be integrated on a same chip, and the digital baseband processor may be disposed on an independent chip. With continuous development of integrated circuit technologies, more and more components may be integrated on a same chip. For example, the digital baseband processor may be integrated on a same chip with a plurality of application processors (for example, but not limited to a geometric processor, a multimedia processor). Such a chip may be referred to as a system on chip. Whether components are independently disposed on different chips or are integrated and disposed on one or more chips usually depends on specific requirements of a product design. Specific implementation forms of the foregoing components are not limited in the embodiments of this application.

An embodiment of this application further provides a computer-readable storage medium, including program code. The program code includes an instruction used to perform a part or all of operations of any method provided in the first aspect or the second aspect.

An embodiment of this application further provides a computer-readable storage medium. The computer-readable storage medium stores a computer program; and when the computer program runs on a computer, the computer is enabled to perform any possible method provided in the first aspect or the second aspect.

An embodiment of this application further provides a computer program product. When the computer program product runs on a computer, any method provided in the first aspect or the second aspect is performed.

This application further provides a communications chip. The communications chip stores an instruction; and when the instruction is run on a network device or a terminal, the network device or the terminal is enabled to perform any method provided in the first aspect or the second aspect.

It may be understood that any channel processing apparatus, processor, processing device, computer-readable storage medium, computer program product, communications chip, or the like provided above is configured to perform the corresponding method provided above. Therefore, for beneficial effects that can be achieved by the channel processing apparatus, processor, processing device, computer-readable storage medium, computer program product, communications chip, or the like, refer to beneficial effects in the corresponding method. Details are not described herein again.

It should be noted that the foregoing components, for example, but not limited to, the memory, the computer-readable storage medium, and the communications chip, that are provided in the embodiments of this application and that are configured to store the computer instruction or the computer program are all non-transitory.

DESCRIPTION OF EMBODIMENTS

Technical solutions provided in this application may be applied to various communications systems. The technical solutions provided in this application may be applied to a 5G communications system, a future evolved system, a plurality of communications convergence systems, or the like, or may be applied to an existing communications system, or the like. Application scenarios of the technical solutions provided in this application may include a plurality of types, for example, machine to machine (M2M), macro-micro communication, enhanced mobile broadband (eMBB), ultra-reliability low-latency communication (uRLLC), and massive machine-type communications (mMTC). The scenarios may include but are not limited to a scenario of communication between terminals, a scenario of communication between network devices, a scenario of communication between a network device and a terminal, and the like. The following provides descriptions by using an example in which the technical solutions are applied to the scenario of communication between the network device and the terminal.

Figure 1:
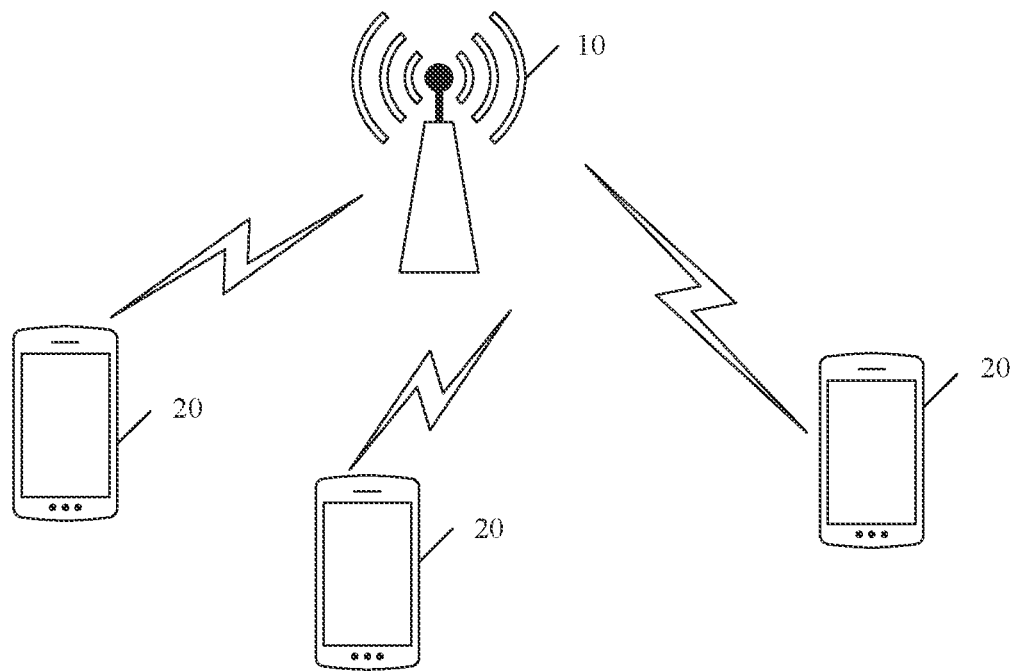
FIG. 1 is a schematic diagram of a communications system applicable to an embodiment of this application.

FIG. 1 is a schematic diagram of a communications system applicable to an embodiment of this application. The communications system may include one or more network devices 10 (only one network device is shown) and one or more terminals 20 connected to each network device 10. FIG. 1 is merely a schematic diagram, and does not constitute a limitation on an applicable scenario of the technical solutions provided in this application.

The network device 10 may be a transmission reception point (TRP), a base station, a relay station, an access point, or the like. The network device 10 may be a network device in a 5G communications system or a network device in a future evolved network; or may be a wearable device, a vehicle-mounted device, or the like. In addition, the network device 10 may alternatively be a base transceiver station (BTS) in a global system for mobile communications (GSM) or in a code division multiple access (CDMA) network, or may be an NB (NodeB) in wideband code division multiple access (WCDMA), or an eNB or an eNodeB (evolutional NodeB) in long term evolution (LTE). The network device 10 may alternatively be a radio controller in a cloud radio access network (CRAN) scenario.

The terminal 20 may be user equipment (UE), an access terminal, a UE unit, UE station, a mobile station, a mobile console, a remote station, a remote terminal, a mobile device, a UE terminal, a wireless communications device, a UE agent, a UE apparatus, or the like. The access terminal may be a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, a terminal in a 5G network, a terminal in a future evolved public land mobile network (PLMN), or the like.

Optionally, each network element (for example, the network device 10 and the terminal 20) in FIG. 1 may be implemented by one device, or may be jointly implemented by a plurality of devices, or may be a function module in one device. This is not limited in this embodiment of this application. It may be understood that the foregoing functions may be network elements in a hardware device, software functions running on dedicated hardware, or virtualized functions instantiated on a platform (for example, a cloud platform).

Figure 2:
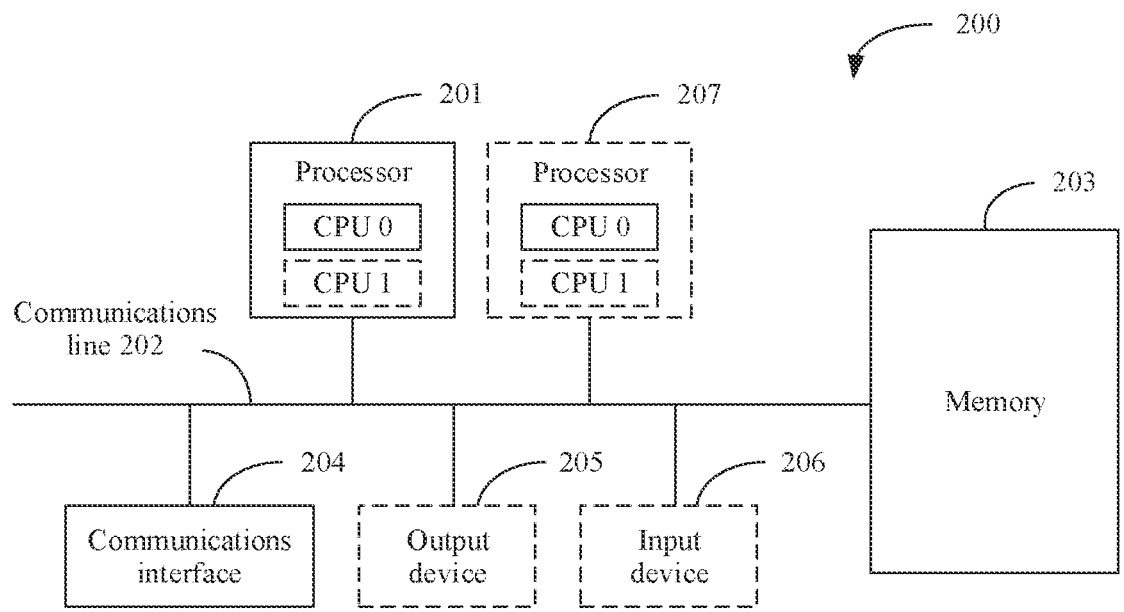
FIG. 2 is a schematic diagram of a hardware structure of a communications device applicable to an embodiment of this application.

For example, each network element in FIG. 1 may be implemented by using the communications device 200 in FIG. 2. FIG. 2 is a schematic diagram of a hardware structure of a communications device applicable to an embodiment of this application. The communications device 200 includes at least one processor 201, a communications line 202, a memory 203, and at least one communications interface 204.

The processor 201 may be a general-purpose central processing unit (CPU), a microprocessor, an application-specific integrated circuit (ASIC), or one or more integrated circuits configured to control program execution in the solutions of this application.

The communications line 202 may include a path for transmitting information between the foregoing components.

The communications interface 204, which uses any apparatus such as a transceiver, is configured to communicate with another device or a communications network, such as Ethernet, a RAN, or a wireless local area network (WLAN).

The memory 203 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another optical disc storage, an optical disc storage (including a compact optical disc, a laser disc, an optical disc, a digital versatile optical disc, a Blu-ray disc, and the like), a magnetic disk storage medium or another magnetic storage device, or any other medium that can be used to carry or store expected program code in an instruction or data structure form and that can be accessed by a computer. However, this is not limited herein. The memory may exist independently, and is connected to the processor through the communications line 202. The memory may alternatively be integrated with the processor. The memory provided in this embodiment of this application may usually be non-volatile. The memory 203 is configured to store a computer executable instruction for executing the solutions in this application, and the processor 201 controls the execution. The processor 201 is configured to execute the computer executable instruction stored in the memory 203, to implement the method provided in the following embodiments of this application.

Optionally, the computer executable instruction in this embodiment of this application may also be referred to as application program code. This is not limited in this embodiment of this application.

During specific implementation, in an embodiment, the processor 201 may include one or more CPUs, for example, a CPU 0 and a CPU 1 in FIG. 2.

During specific implementation, in an embodiment, the communications device 200 may include a plurality of processors, for example, the processor 201 and a processor 207 in FIG. 2. Each of the processors may be a single-core (single-CPU) processor or a multi-core (multi-CPU) processor. The processors herein may be one or more devices, circuits, or processing cores for processing data (for example, a computer program instruction).

During specific implementation, in an embodiment, the communications device 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, a projector, or the like. The input device 206 communicates with the processor 201, and may receive an input from a user in a plurality of manners. For example, the input device 206 may be a mouse, a keyboard, a touchscreen device, a sensing device, or the like.

The communications device 200 may be a general-purpose device or a dedicated device. During specific implementation, the communications device 20 may be a desktop computer, a portable computer, a network server, a palmtop computer (PDA), a mobile phone, a tablet computer, a wireless terminal device, an embedded device, or a device having a structure similar to that in FIG. 2. A type of the communications device 200 is not limited in this embodiment of this application.

The technical solutions provided in the embodiments of this application are described with reference to the accompanying drawings.

The following explains and describes related terms and technologies in this application.

It should be noted that, unless otherwise specified, descriptions and the like of related embodiments in this application are all described based on an example of a single polarization direction. Unless otherwise specified, explanations of any term, descriptions of related embodiments, and the like in the following are described based on an example in which there is one layer (that is, one spatial stream). This is uniformly described herein, and is not described below again.

(1) Receive End Device and Transmit End Device

The receive end device may be the terminal 20 in FIG. 1, and the transmit end device may be the network device 10 in FIG. 1. Alternatively, the receive end device may be the network device 10 in FIG. 1, and the transmit end device may be the terminal 20 in FIG. 1. In the following specific examples, an example in which the transmit end device is a network device and the receive end device is a terminal is used for description.

(2) Bandwidth and Frequency Band

System bandwidth (which may also be referred to as carrier bandwidth) may be divided into a plurality of frequency bands. In the embodiments of this application, a quantity of frequency bands into which the system bandwidth is divided is not limited, or a frequency domain granularity (or a frequency band size) used during frequency band division is not limited. For example, the frequency domain granularity may be one or more resource blocks (RB), or one or more subcarriers. In addition, for an implementation of dividing the system bandwidth into the plurality of frequency bands, refer to the conventional technology. For example, refer to a sub-band in the LTE standard to understand the frequency band.

The embodiments of this application further relate to "available bandwidth"; to be specific, available bandwidth configured by the transmit end device for the receive end device, and may also be referred to as available bandwidth of the receive end device, for example, a BWP (bandwidth part) of the receive end device. A frequency band included in the available bandwidth may be a part or all of frequency bands included in the system bandwidth. Frequency bands included in the available bandwidth configured by the transmit end device for different receive end devices may be the same or may be different.

The embodiments of this application further relate to "a frequency band corresponding to channel information that needs to be fed back"; to be specific, a frequency band corresponding to the channel information fed back by the receive end device through an indication from the transmit end device. The frequency band may also be referred to as bandwidth corresponding to the channel information that needs to be fed back by the receive end device, and may be a part or all of frequency bands included in the available bandwidth of the receive end device.

For example, it is assumed that the system bandwidth is divided into 20 frequency bands, which are respectively marked as a frequency band 1 to a frequency band 20. Frequency bands included in available bandwidth configured by the transmit end device for a receive end device may be the frequency band 1 to the frequency band 10. Frequency bands corresponding to the channel information that needs to be fed back and that is configured by the transmit end device for the receive end device may be the frequency band 1 to the frequency band 5, or the frequency bands 1, 3, 5, 7, and 9, or the like.

(3) Space Domain Basis Vector

Each space domain basis vector may correspond to a transmit beam of the transmit end device.

The space domain basis vector is usually associated with an antenna array. For example, many parameters in a space domain basis vector expression may be understood as being used to represent different attributes of the antenna array. Therefore, to facilitate understanding of the space domain basis vector in the embodiments of this application, the following describes the space domain basis vector with reference to the antenna array. However, a person skilled in the art should understand that the space domain basis vector in the embodiments of this application is not limited to a specific antenna array. In a specific implementation process, an appropriate antenna array may be selected based on a specific requirement, and various parameters in the space domain basis vector in the embodiments of this application are set based on the selected antenna array, so as to determine a space-frequency basis vector by using the space domain basis vector in the embodiments of this application.

Figure 3:
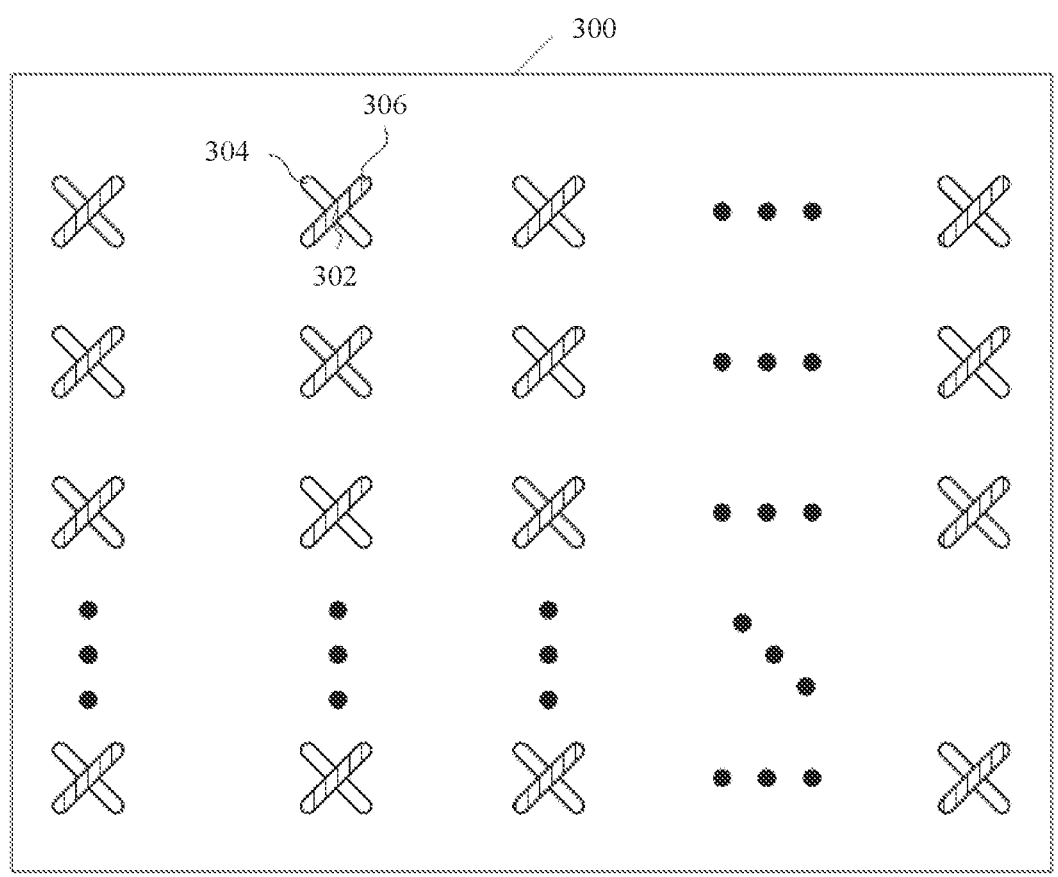
FIG. 3 is a schematic diagram of an antenna array applicable to an embodiment of this application.

FIG. 3 is a schematic diagram of an antenna array 300 applicable to an embodiment of this application. As shown in FIG. 3, the antenna array 300 includes a plurality of vibration element groups 302, and the vibration element groups 302 are arranged in a matrix manner. Specifically, each row of the matrix includes a plurality of vibration element groups 302, and each column includes a plurality of vibration element groups 302. Each vibration element group 302 includes two vibration elements: a vibration element 304 working in a first polarization direction and a vibration element 306 working in a second polarization direction.

In a specific implementation process, the space domain basis vector may be obtained by using a Kronecker product of two vectors. The two vectors respectively represent space domain characteristics of two dimensions in space domain. For example, with reference to FIG. 3, the two dimensions may be a dimension in which a row is located and a dimension in which a column is located, where the row and the column are in the matrix including the vibration element groups 302 shown in FIG. 3.

In this embodiment of this application, the space domain basis vector is N dimensional; to be specific, the space domain basis vector includes N elements. N may be a quantity of transmit antenna ports of the transmit end device in a polarization direction, where $N \geq 2$, and N is an integer.

(4) Frequency Domain Basis Vector

Each frequency domain basis vector may correspond to a frequency band change mode of a channel. In brief, each frequency band may be represented by using an element corresponding to the frequency band in the frequency domain basis vector. In this way, the element corresponding to each frequency band in the frequency domain basis vector may reflect a frequency band change mode. The frequency band change mode may be used to represent a change rule of the channel on each frequency band in all frequency bands including, for example, each frequency band. A frequency band change mode represents a change rule of the channel on each frequency band. For example, if elements of a frequency domain basis vector are equal, the frequency domain basis vector may represent a frequency band change mode in which the channel remains unchanged on each frequency band. For example, if adjacent elements of a frequency domain basis vector change greatly, the frequency domain basis vector may represent a frequency band change mode in which the channel changes drastically in each frequency band.

In this embodiment of this application, the frequency domain basis vector is $N_f$ dimensional, where $N_f \geq 1$, and $N_f$ is an integer. For example, $N_f$ may be a quantity of frequency bands included in the available bandwidth of the receive end device.

(5) Space-Frequency Basis Vector and Space-Frequency Basis Vector Set

The space-frequency basis vector set is a set including a series of space-frequency basis vectors. The space-frequency basis vector set may usually be represented in a matrix form. The space-frequency basis vector may be a column vector of the matrix. The space-frequency basis vector has a space domain characteristic and a frequency domain characteristic.

The space-frequency basis vector may be understood as a vector obtained by performing a Krone product on a vector representing the space domain characteristic and a vector representing the frequency domain characteristic. Specifically, the vector representing the space domain characteristic may be a space domain basis vector or a variant thereof. The vector representing the frequency domain characteristic may be a frequency domain basis vector or a variant thereof. The foregoing variant may be, for example, but is not limited to: transpose, conjugate, or conjugate transpose. It is clear that, this embodiment of this application is not limited thereto. For example, a space-frequency basis vector v may be obtained by using but is not limited to any one of the following formulas: $v=u_1 \otimes u_2$, $v=u_1 \otimes \bar{u}_2$, $v=\bar{u}_1 \otimes u_2$, $v=u_2 \otimes u_1$, $v=\bar{u}_2 \otimes u_1$, and $v=u_2 \otimes \bar{u}_1$, where $u_1$ is a space domain basis vector, $u_2$ is a frequency domain basis vector, $\bar{u}_1$ is a conjugate vector of $u_1$, $\bar{u}_2$ is a conjugate vector of $u_2$, and $\otimes$ represents a Kronecker product.

In this embodiment of this application, the space-frequency basis vector is $N_f \times N$ dimensional.

In a specific implementation process, the receive end device and the transmit end device may preset a space-frequency basis vector set. Alternatively, the receive end device and the transmit end device may preset a space domain basis vector set and a frequency domain basis vector set, and then generate the space-frequency basis vector based on the space domain basis vector in the space domain basis vector set and the frequency domain basis vector in the frequency domain basis vector set. The space domain basis vector set is a set including space domain basis vectors used to generate each space domain basis vector in the space domain basis vector set, and the frequency domain basis vector set is a set including frequency domain basis vectors used to generate each space domain basis vector in the space domain basis vector set. This is not limited in this embodiment of this application.

(6) Space-Frequency Component Vector

Each space-frequency component vector is a vector including a part or all of elements that are in one space-frequency basis vector. In this embodiment of this application, the space-frequency component vector is M×N dimensional, where M≥1, and M is an integer.

For example, M may be a quantity of frequency bands corresponding to the channel information that needs to be fed back by the receive end device. Each space-frequency component vector may be a vector including M×N elements that are at preset locations in one space-frequency basis vector. The preset location may be a location of an element corresponding to a frequency band corresponding to the channel information that needs to be fed back in the space-frequency basis vector. Specifically, the space-frequency component vector may be a vector including M specific elements of every $N_f$ elements from the first element to the last element in one space-frequency basis vector.

For example, it is assumed that the available bandwidth of the receive end device is the frequency band 1 to the frequency band 10, and $N_f$ is a quantity (that is, $N_f=10$) of frequency bands included in the available bandwidth of the receive end device, when frequency bands corresponding to the channel information that needs to be fed back by the receive end device are the frequency band 1 to the frequency band 5, the space-frequency component vector is a vector including the first 1 to 5 elements of every 10 elements from the first element to the last element in one space-frequency basis vector (that is, a 10×N-dimensional vector); and when frequency bands corresponding to the channel information that needs to be fed back by the receive end device are the frequency bands 1, 3, 5, 7, and 9, the space-frequency component vector is a vector including the first, third, fifth, seventh, and ninth elements of every 10 elements from the first element to the last element in one space-frequency basis vector (that is, a 10×N-dimensional vector).

(7) Space-Frequency Vector

The space-frequency vector is an M×N-dimensional vector including M precoding vectors. For example, elements in the first to the $M^{th}$ precoding vectors that are in the M precoding vectors are sequentially spliced, to form an M×N-dimensional vector. Each precoding vector is used in one of M frequency bands, and the M frequency bands may be frequency bands corresponding to the channel information (for example, information used to construct the precoding vector) that needs to be fed back by the receive end device. A precoding vector is usually used to represent channel information corresponding to a single spatial stream transmitted on one frequency band. The precoding vector is N dimensional.

For the receive end device, the space-frequency vector may be obtained based on a channel matrix. An implementation in which the receive end device obtains the space-frequency vector based on the channel matrix is not limited in this application. For example, refer to the related description in Chinese Patent Application No. 201810075250.X, and entitled "CHANNEL ESTIMATION METHOD AND APPARATUS".

After determining the space-frequency vector V, the receive end device may indicate related information of the space-frequency vector V to the transmit end device. After receiving the related information, the transmit end device may determine the space-frequency vector V according to a formula $$V = \sum_{z=1}^{Z} \hat{g}_z v_z,$$

where Z is a quantity of space-frequency component vectors, $v_z$ is the $z^{th}$ space-frequency component vector, $1 \leq z \leq Z$, $Z \geq 2$, both Z and z are integers, and $\hat{g}_z$ is a weight of $v_z$. Then, the M precoding vectors are determined based on the determined space-frequency vector V. and precoding is performed on to-be-sent data based on the M precoding vectors. For example, the M precoding vectors are used to perform precoding, or the M precoding vectors are adjusted, and adjusted M precoding vectors are used to perform precoding, so as to send precoded data.

It may be understood that if the space-frequency vector is a column vector, the space-frequency component vector is a column vector. If the space-frequency vector is a row vector, the space-frequency component vector is a row vector.

It should be noted that, in the descriptions in this specification, unless otherwise specified, or if the vector described in this specification does not collide with an actual function or internal logic of the vector described in the related description, the vector described in this specification may be understood as a vector in a same form, for example, a row vector or a column vector.

In addition, the term "a plurality of" in this application means two or more. In addition, the character "/" in this specification usually indicates an "or" relationship between the associated objects. When the character "/" is used in a formula, the character usually represents a "division" relationship between the associated objects. For example, a formula A/B represents that A is divided by B. In this application, the terms "first", "second", and the like are intended to distinguish between different objects but do not indicate a particular order of the different objects.

It should be noted that, for ease of description, the following uses an example in which any vector (for example, a space-frequency vector, a space-frequency component vector, a space-frequency basis vector, or a precoding vector) is a column vector for description. Unified description is provided herein, and details are not described in the following. It may be understood that during specific implementation, the any vector may also be a row vector. A person skilled in the art should be able to reasonably infer, based on the technical solution provided in this application without creative efforts, that the any vector is a row vector. A corresponding technical solution is not described again in this specification. Further, in a specific implementation process, a form of a vector used in this specification may be adjusted based on a specific requirement. For example, the vector is transposed, or the vector is represented as a conjugate form of the vector, or a combination of the foregoing manners or another manner. Therefore, all the foregoing speculations and adjustments should be understood as falling within the scope of the embodiments of this application.

The following describes the technical solutions provided in the embodiments of this application with reference to the accompanying drawings.

Figure 4:
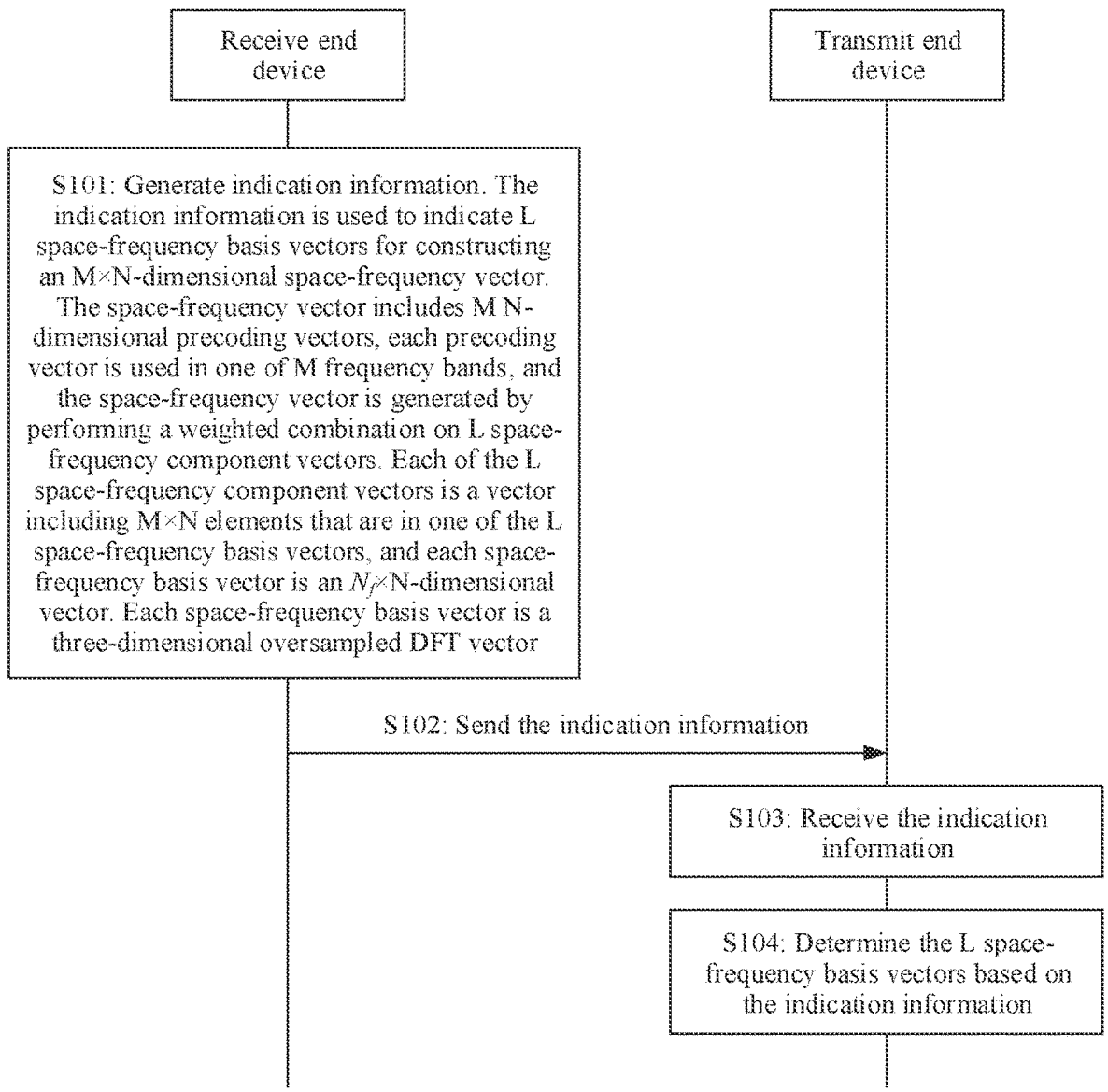
FIG. 4 is a schematic interaction diagram 1 of a channel estimation method according to an embodiment of this application.

FIG. 4 is a schematic interaction diagram of a channel estimation method according to an embodiment of this application. The method shown in FIG. 4 may include the following operations.

S101: A receive end device generates indication information. The indication information is used to indicate L space-frequency basis vectors for constructing an M×N-dimensional space-frequency vector. The space-frequency vector includes M N-dimensional precoding vectors, each precoding vector is used in one of M frequency bands, and the space-frequency vector is generated by performing a weighted combination on L space-frequency component vectors. Each of the L space-frequency component vectors is a vector including M×N elements that are in one of the L space-frequency basis vectors, and each of the L space-frequency basis vectors is a $N_f$×N-dimensional vector. The space-frequency basis vector is a three-dimensional oversampled discrete Fourier transform (DFT) vector. L≥2, $N_f$≥M≥1, N≥2, and L, M, N, and $N_f$ are all integers.

Each of the M N-dimensional precoding vectors may be a precoding vector based on which a single spatial stream is transmitted in each of the M frequency bands.

Optionally, M may be a quantity of frequency bands corresponding to channel information fed back by the receive end device, and the quantity is indicated by a transmit end device.

Optionally, any two of the L space-frequency basis vectors are different.

Each of the L space-frequency component vectors is a vector including M×N elements that are in one of the L space-frequency basis vectors. In other words, each space-frequency component vector is obtained by using one space-frequency basis vector, or each space-frequency component vector corresponds to one space-frequency basis vector. Usually, different space-frequency component vectors correspond to different space-frequency basis vectors.

Three-dimensional oversampling refers to oversampling at least one of "two dimensions of a space domain characteristic and one dimension of a frequency domain characteristic". For example, the three-dimensional oversampling may be oversampling two dimensions in space domain, but skipping oversampling one dimension in frequency domain; or may be skipping oversampling two dimensions in space domain, but oversampling one dimension in frequency domain; or may be oversampling both two dimensions in space domain and one dimension in frequency domain.

Optionally, $N_f$ may be a quantity of frequency bands included in available bandwidth configured by the transmit end device for the receive end device.

A specific implementation in which the receive end device obtains $N_f$ is not limited in this embodiment of this application. For example, $N_f$ may be predefined, for example, predefined in a protocol. For another example, $N_f$ may be set by the transmit end device by sending configuration information to the receive end device. The configuration information may be at least one of RRC signaling, MAC signaling, and downlink control information (DCI). For example, the configuration information may be the RRC signaling or the MAC signaling.

If $N_f$ is set by the transmit end device by sending the configuration information to the receive end device, information that is included in the configuration information and that is used to configure $N_f$ is not limited in this embodiment of this application.

Optionally, a value of $N_f$ may be directly configured by using the configuration information. For example, the configuration information includes the value of $N_f$.

Optionally, a value of $N_f$ may be indirectly configured by using the configuration information. For example, the configuration information may include available bandwidth and a frequency band size. In other words, the value of $N_f$ is indirectly configured by configuring the frequency band size and the available bandwidth of the receive end device. It may be understood that the value of $N_f$ is a value obtained by dividing the available bandwidth of the receive end device by the frequency band size. For another example, the configuration information may include a length of signaling used to indicate a frequency band location reported in channel state information (CSI). The length of the signaling is the value of $N_f$.

S102: The receive end device sends the indication information.

If information indicated by the indication information is referred to as to-be-indicated information, in a specific implementation process, there are many manners of indicating the to-be-indicated information. For example, the to-be-indicated information may be directly indicated, for example, the to-be-indicated information or an index of the to-be-indicated information. The to-be-indicated information may alternatively be indirectly indicated by indicating other information, where there is an association relationship between the other information and the to-be-indicated information. Alternatively, only a part of the to-be-indicated information may be indicated, and the other part of the to-be-indicated information is known or agreed on in advance. For example, specific information may also be indicated by using a predefined (for example, stipulated in a protocol) arrangement sequence of various pieces of information, to reduce indication overheads to some extent. In addition, a common part of all the pieces of information may be further identified and indicated in a unified manner, to reduce indication overheads caused by separately indicating same information. For a specific example, refer to the following.

The to-be-indicated information may be sent as a whole, or may be divided into a plurality of pieces of sub-information for separate sending, and sending periodicities or sending occasions of the sub-information may be the same or may be different. A specific sending method is not limited in this application. The sending periodicities or the sending occasions of the sub-information may be predefined, for example, predefined according to a protocol, or may be configured by the transmit end device by sending the configuration information to the receive end device. The configuration information may include, for example, but is not limited to, one or a combination of at least two of the RRC signaling, the MAC signaling, and the DCI.

The indication information may be a precoding vector indicator (PMI), or may be other indication information. The indication information may be carried in one or more messages in the conventional technology and sent by the receive end device to the transmit end device, or may be carried in one or more messages newly designed in this application and sent by the receive end device to the transmit end device.

In addition, it should be understood that the method shown in FIG. 4 is described based on a case in which a single spatial stream (for example, a data layer obtained through layer mapping) is sent in each sub-band in a single polarization direction. However, a person skilled in the art should understand that the technical solutions provided in the embodiments of this application are not limited thereto, and the technical solutions provided in the embodiments of this application may be extended to a case in which a plurality of spatial streams are sent in each sub-band in a plurality of polarization directions. It is not difficult to understand that in this case, the indication information includes a related indication of a precoding vector of each of the plurality of spatial streams in each of the plurality of polarization directions in each of the M frequency bands. It can be learned that the indication information mentioned in this embodiment of this application does not exclude the following case: In addition to the indicated space-frequency vector in S101, one or more other space-frequency vectors are further indicated. The space-frequency vectors may correspond to different polarization directions, different spatial streams, or the like. In addition, if the indication information includes the related indication of the precoding vector of each of the plurality of spatial streams in each of the plurality of polarization directions in each of the M frequency bands, it should be understood that a specific indication method may be set based on a specific requirement. For example, refer to various indication manners described in this application.

In brief, the space-frequency component vector provided in this embodiment of this application combines a basic space domain characteristic and a basic frequency domain characteristic, to obtain a basic space-frequency characteristic. The basic space domain characteristic may be understood as describing a basic spatial direction, and the basic frequency domain characteristic may be understood as a change mode of a channel in a plurality of frequency bands. In this way, the space-frequency component vector may be understood as describing a basic space-frequency characteristic. On this basis, more space-frequency characteristics can be described by performing a weighted summation on a plurality of space-frequency component vectors.

S103: The transmit end device receives the indication information.

S104: The transmit end device determines the L space-frequency basis vectors based on the indication information.

Subsequently, the transmit end device may determine, based on the L determined space-frequency basis vectors, L space-frequency component vectors used to construct the space-frequency vector. For an example of a specific implementation of the process, refer to the foregoing description. Details are not described herein again. It may be understood that the indication information may be further used to indicate weights of the L space-frequency component vectors. On this basis, the transmit end device may perform a weighted summation by using the L determined space-frequency component vectors and the weights that are of the L space-frequency component vectors and that are indicated by the indication information, to obtain the space-frequency vector. Further, to-be-sent data is precoded based on the M N-dimensional precoding vectors included in the space-frequency vector.

According to the technical solution provided in this embodiment of this application, because the M N-dimensional precoding vectors may form a space-frequency vector, and the space-frequency vector is generated by performing a weighted combination on a plurality of space-frequency component vectors, a condition may be created for reducing indication overheads of the precoding vectors. For example, the M N-dimensional precoding vectors may be indicated by indicating the space-frequency vector. Further, the space-frequency vector may be indicated by indicating the plurality of space-frequency component vectors. Furthermore, the plurality of space-frequency component vectors may be indicated by constructing a plurality of space-frequency basis vectors of the plurality of space-frequency component vectors. Therefore, compared with the conventional technical solution of independently indicating a precoding vector corresponding to each frequency band, the technical solution provided in this embodiment of this application helps reduce the indication overheads. In addition, the foregoing technical solution further provides specific representation forms of the plurality of space-frequency basis vectors. To be specific, each space-frequency basis vector is a three-dimensional oversampled DFT vector. In this way, the space-frequency basis vector can be compatible with an existing type II codebook type, so that an implementation of the terminal is simple.

Figure 5:
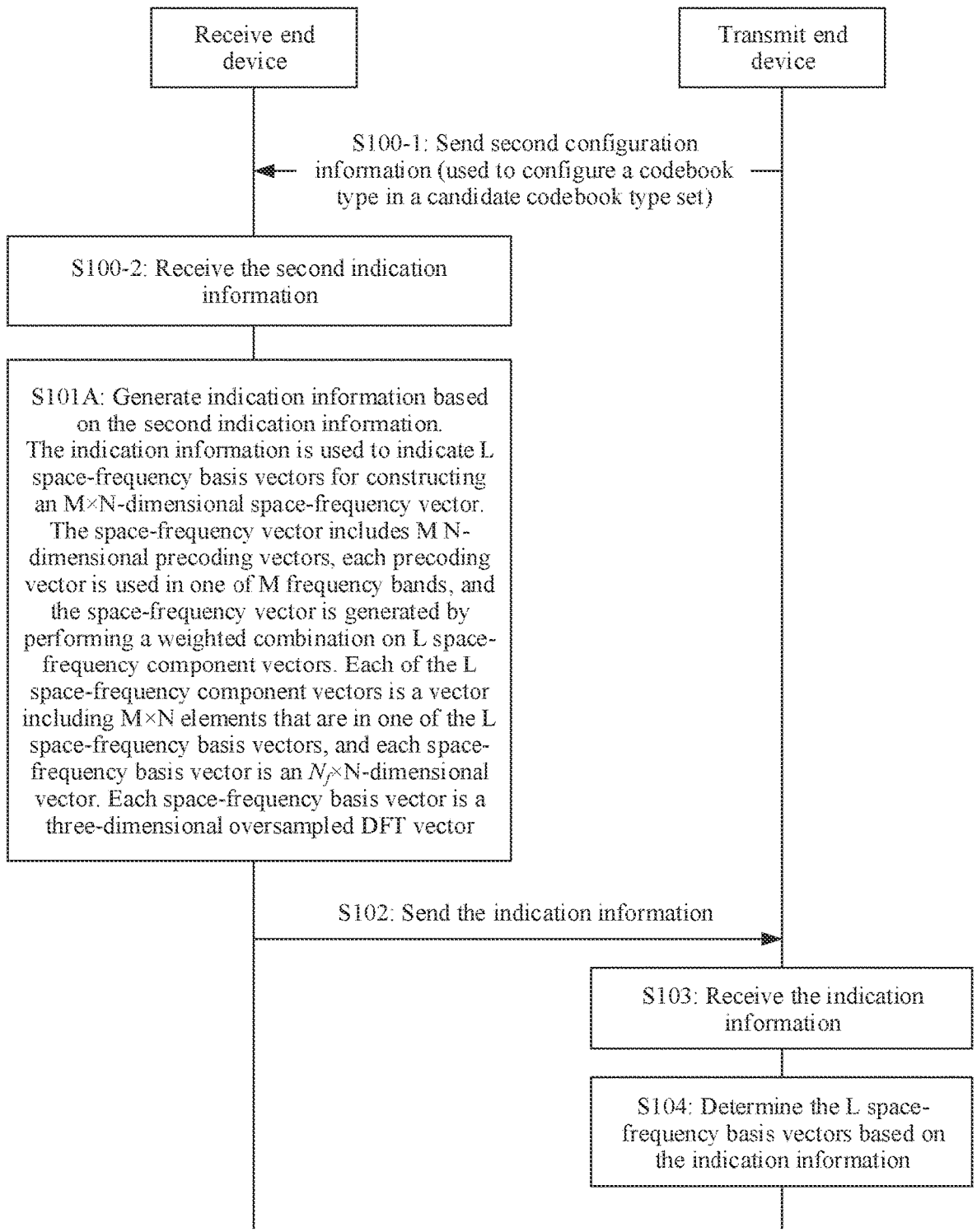
FIG. 5 is a schematic interaction diagram 2 of a channel estimation method according to an embodiment of this application.

Optionally, as shown in FIG. 5, before S101, the method may further include the following operations: S100-1 and S100-2.

S100-1: The transmit end device sends second configuration information to the receive end device, where the second configuration information is used to configure a codebook type in a candidate codebook type set.

S100-2: The receive end device receives the second configuration information.

In this case, S101 may be operation S101A: The receive end device generates indication information based on second configuration information.

The second configuration information may be at least one of RRC signaling, MAC signaling, or DCI. For example, the second configuration information may be the RRC signaling or the MAC signaling.

The candidate codebook type set may include at least two codebook types. The at least two codebook types include a codebook type constructed based on the space-frequency basis vector provided in this embodiment of this application, namely, the codebook type provided in this embodiment of this application. The at least two codebook types may further include a type II codebook type. Alternatively, the at least two codebook types may further include a type I codebook type and a type II codebook type. The second configuration information is used to indicate the codebook type that is included in the candidate codebook type set and that is provided in this embodiment of this application.

The codebook type provided in this embodiment of this application may be referred to as a new type II codebook type. Alternatively, the type II codebook type provided in the conventional technology may be considered as a mode of the type II codebook type, and the codebook type provided in this embodiment of this application may be considered as another mode of the type II codebook type. It is clear that, this embodiment of this application is not limited thereto.

If there are two polarization directions, and space-frequency component vectors corresponding to each polarization direction are the foregoing L space-frequency component vectors, a codebook type (that is, a precoding vector W) provided in this embodiment of this application may be:

$$W = \frac{1}{\sqrt{P}} \begin{bmatrix} \sum_{i=0}^{L-1} p_i \varphi_i v_{m_1^{(i)},m_2^{(i)},m_3^{(i)}} \\ \sum_{i=0}^{L-1} p_{i+L} \varphi_{i+L} v_{m_1^{(i)},m_2^{(i)},m_3^{(i)}} \end{bmatrix},$$

where

P is a power normalization factor, and $P = N_1 N_2 N_f \sum_{i=0}^{2L-1}(p_i)^2$.

$v_{m_1^{(i)},m_2^{(i)},m_3^{(i)}}$ is an $i^{th}$ space-frequency component vector in the L space-frequency component vectors. $v_{m_1^{(i)},m_2^{(i)},m_3^{(i)}}$ is a vector including M×N elements that are in $b_{m_1^{(i)},m_2^{(i)},m_3^{(i)}}$; to be specific, $v_{m_1^{(i)},m_2^{(i)},m_3^{(i)}}$ is M×N dimensional. $b_{m_1^{(i)},m_2^{(i)},m_3^{(i)}}$ is a three-dimensional oversampled DFT vector, and $b_{m_1^{(i)},m_2^{(i)},m_3^{(i)}}$ is $N_f$×N dimensional.

$p_i$ is an amplitude of a weight of the $i^{th}$ space-frequency component vector in the L space-frequency component vectors, and $0 \le p_i \le 1$.

$\varphi_i$ is a phase of a weight of the $i^{th}$ space-frequency component vector in the L space-frequency component vectors, $$\varphi_i \in \left\{ e^{j\frac{2\pi x}{N_{PSK}}}, x = 0 \sim N_{PSK} - 1 \right\},$$

and $N_{PSK}$ is a phase shift keying (PSK) spatial point quantity.

Optionally, $p_i$, $\varphi_i$ and $v_{m_1^{(i)},m_2^{(i)},m_3^{(i)}}$ may all be broadband feedback information, that is, information fed back by using a broadband, or may all be narrowband feedback information, that is, information fed back by using a narrowband. Optionally, any one of the parameters $p_i$, $\varphi_i$ and $v_{m_1^{(i)},m_2^{(i)},m_3^{(i)}}$ may be long-time feedback information, that is, information whose feedback periodicity is greater than a threshold; or may be short-time feedback information, that is, information whose feedback periodicity is less than a threshold. Optionally, either of the parameters $\varphi_i$ and $v_{m_1^{(i)},m_2^{(i)},m_3^{(i)}}$ may be fed back in a differential feedback manner (for example, a broadband differential feedback manner, a narrowband differential feedback manner, a long-term differential feedback manner, or a short-term differential feedback manner).

It should be noted that the foregoing codebook type is merely an example, and does not constitute a limitation on the codebook type provided in this embodiment of this application.

Optionally, $b_{m_1^{(i)},m_2^{(i)},m_3^{(i)}}$ is selected from a space-frequency basis vector set. Each space-frequency basis vector in the space-frequency basis vector set may be a Kronecker product of three vectors, and one of the three vectors is constructed based on an $N_f$-dimensional vector (for example, the frequency domain basis vector described above).

In an example, an element $b_{l,m,s}$ in the space-frequency basis vector set is:

$$b_{l,m,s} = \left[ v_{l,m}^T \quad e^{j\frac{2\pi s}{O_f N_f}} v_{l,m}^T \quad \ldots \quad e^{j\frac{2\pi s(N_f-1)}{O_f N_f}} v_{l,m}^T \right]^T,$$

where $O_f$ is a preset value, both $O_f$ and $N_f$ are positive integers, and $0 \le s \le O_f N_f - 1$;

$$v_{l,m} = \left[ u_m \quad e^{j\frac{2\pi l}{O_1 N_1}} u_m \quad \ldots \quad e^{j\frac{2\pi l(N_1-1)}{O_1 N_1}} u_m \right]^T,$$

where $O_1$ and $N_1$ are preset values, both $O_1$ and $N_1$ are positive integers, and $0 \le l \le O_1 N_1 - 1$; and $$u_m = \begin{cases} \left[ 1 \quad e^{j\frac{2\pi m}{O_2 N_2}} \quad \ldots \quad e^{j\frac{2\pi m(N_2-1)}{O_2 N_2}} \right] & N_2 > 1 \\ 1 & N_2 = 1 \end{cases},$$

where both $O_2$ and $N_2$ are positive integers, and $0 \le m \le O_2 N_2 - 1$.

In a specific implementation process, functions of $O_1$ and $O_2$ may be understood as oversampling two dimensions in space domain. $N_1$ and $N_2$ may be used to represent a quantity of vibration element groups 302 of vibration element groups 302 in each row (or column) of the antenna array 300 shown in FIG. 3 and a quantity of vibration element groups 302 of vibration element groups 302 in each column (or row).

In a specific implementation process, the function of $O_f$ may be understood as oversampling one dimension in frequency domain.

In a specific implementation process, $v_{l,m}$ may be considered as an N-dimensional space domain basis vector, and $N = N_1 \times N_2$.

It should be noted that the expression of the element $b_{l,m,s}$ is merely an example applicable to this application, and does not constitute a limitation on the space-frequency basis vector provided in this embodiment of this application.

Optionally, the space-frequency basis vector set includes at least two space-frequency basis vector subsets, and any two space-frequency basis vectors included in each space-frequency basis vector subset are orthogonal to each other. It may be understood that, because the space-frequency basis vector is an $N_f$×N-dimensional vector, that is, an $N_f$×$N_1$×$N_2$-dimensional vector, a quantity of mutually orthogonal space-frequency basis vectors may be $N_f$×$N_1$×$N_2$. In other words, each space-frequency basis vector subset may include $N_f$×$N_1$×$N_2$ space-frequency basis vectors.

In a specific implementation process, an index of the space-frequency basis vector subset may be represented by using values of $q_1$, $q_2$, and $q_f$, where $q_1 \in \{0,1,K,O_1-1\}$, $q_2 \in \{0,1,K,O_2-1\}$, $q_f \in \{0,1,K,O_f-1\}$, and $q_1$, $q_2$, and $q_f$ are all integers.

In a specific implementation process, an index of a space-frequency basis vector in the space-frequency basis vector subset may be represented by using values of $n_1$, $n_2$, and $n_3$, where $n_1 \in \{0,1,K,N_1-1\}$, $n_2 \in \{0,1,K,N_2-1\}$, $n_3 \in \{0, 1,K,N_f-1\}$, and $n_1$, $n_2$, and $n_3$ are all integers.

In one embodiment, the indication information may be used to indicate the space-frequency basis vector subset from which the L space-frequency basis vectors are selected, and indexes of the L space-frequency basis vectors in the space-frequency basis vector subset. For a specific example of the indexes of the L space-frequency basis vectors in the space-frequency basis vector subset, refer to the following.

In one embodiment, the L space-frequency basis vectors are selected from a same space-frequency basis vector subset. In this way, on the one hand, it can be ensured that any two of the L space-frequency basis vectors are orthogonal to each other, thereby improving accuracy of the precoding vector determined by the transmit end device based on the L space-frequency basis vectors. On the other hand, the indication information indicates the L space-frequency basis vectors by indicating a common part (specifically, the same space-frequency basis vector subset) of the L space-frequency basis vectors, so as to reduce indication overheads.

For example, it is assumed that each of $O_1$, $O_2$, $O_f$, $N_1$, $N_2$, and $N_f$ is 4, when the indication information indicates the indexes of the L space-frequency basis vectors in the space-frequency basis vector set, because $O_1N_1=16$, $O_2N_2=16$, and $O_fN_f=16$, each of indexes "l", "m", and "s" of $b_{l,m,s}$ needs to be indicated by using 4 bits; in other words, indexes of $b_{l,m,s}$ need to be indicated by using 12 bits. Therefore, a total of 12×L bits are required by the indication information to indicate the indexes of the L space-frequency basis vectors. However, based on the embodiment, each of the values of $q_1$, $q_2$, $q_f$, $n_1$, $n_2$, and $n_3$ may be represented by using 2 bits. Indexes of a space-frequency basis vector subset may be represented by using the values of $q_1$, $q_2$, and $q_f$, and 6 bits are required in total; and indexes of each space-frequency basis vector in the space-frequency basis vector subset may be represented by using the values of $n_1$, $n_2$, and $n_3$, and 6 bits are required in total. Therefore, 6+6×L bits are required in total by the indication information to indicate the indexes of the L space-frequency basis vectors. It can be learned that, the common part (specifically, the same space-frequency basis vector subset) of the L space-frequency basis vectors is indicated, so as to reduce the indication overheads.

It may be understood that, if indexes of the $i^{th}$ space-frequency basis vector in the L space-frequency basis vectors are represented as $(m_1^{(i)}, m_2^{(i)}, m_3^{(i)})$, and indexes of the $i^{th}$ space-frequency basis vector in the space-frequency basis vector set are represented as $(n_1^{(i)}, n_2^{(i)}, n_3^{(i)})$, where $n_1^{(i)} \in \{0,1,K,N_1-1\}$, $n_2^{(i)} \in \{0,1,K,N_2-1\}$, $n_3^{(i)} \in \{0,1,K,N_3-1\}$, $n_1^{(i)}$, $n_2^{(i)}$, and $n_3^{(i)}$ are all integers, $0 \le i \le L-1$, and i is an integer, relationships between $(n_1^{(i)}, n_2^{(i)}, n_3^{(i)})$ and $(m_1^{(i)}, m_2^{(i)}, m_3^{(i)})$ may be:

$$m_1^{(i)} = O_1 n_1^{(i)} + q_1,$$

$$m_2^{(i)} = O_2 n_2^{(i)} + q_2, \text{ and}$$

$$m_3^{(i)} = O_f n_3^{(i)} + q_f.$$

It should be noted that, in this embodiment of this application, a technical solution in which the L space-frequency basis vectors are selected from different space-frequency basis vector subsets is not excluded. For a specific example in this case, details are not described herein.

Figure 6:
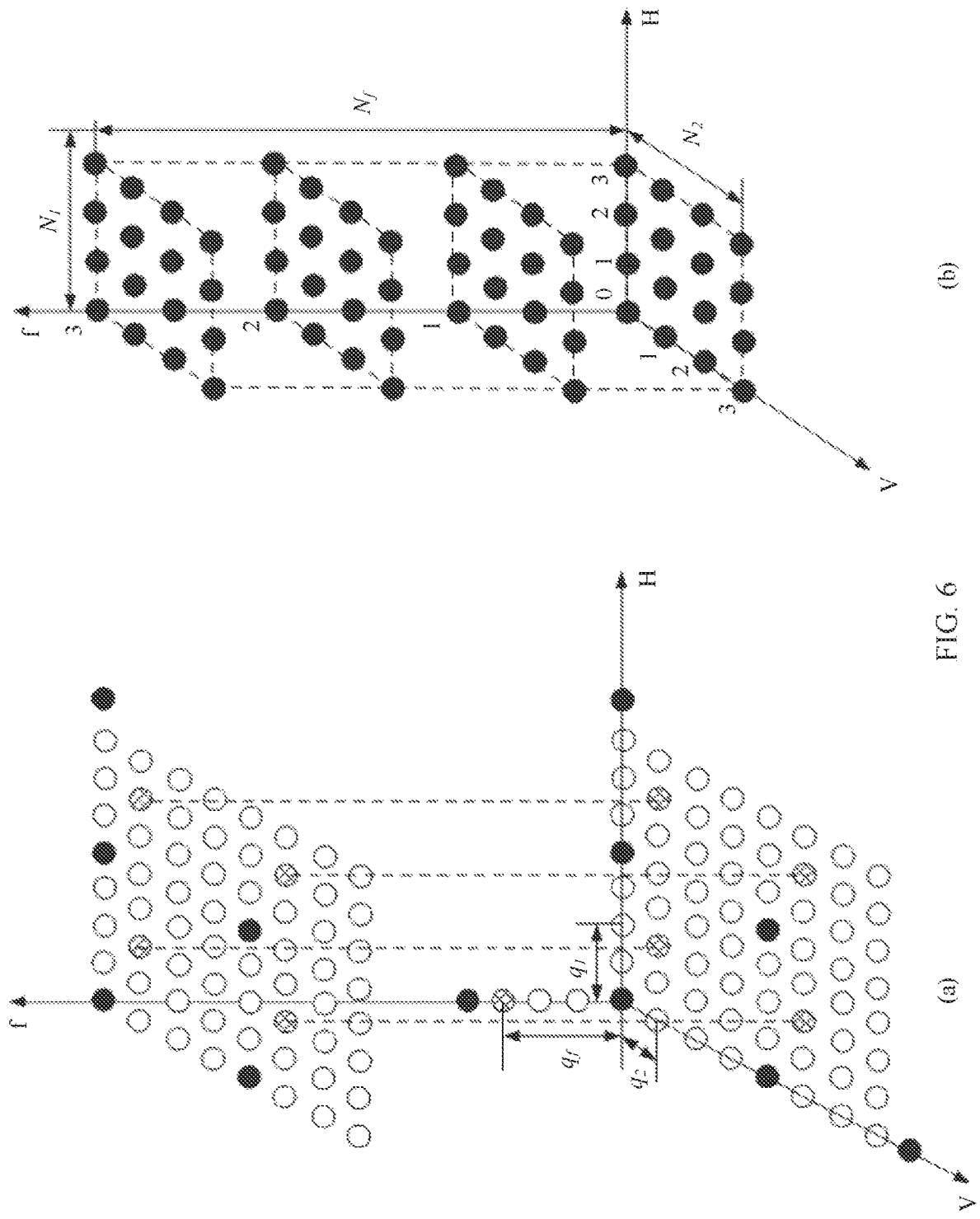
FIG. 6 is a schematic diagram of a space-frequency basis vector set according to an embodiment of this application.

FIG. 6 is a schematic diagram of a space-frequency basis vector set according to an embodiment of this application. (a) in FIG. 6 shows a three-dimensional coordinate system (that is, an H-V-f coordinate system) and a location that is of a space-frequency basis vector in the space-frequency basis vector set and that is in the three-dimensional coordinate system. The H axis and the V axis represent two dimensions in space domain, the f axis represents one dimension in frequency domain, and each circle represents one space-frequency basis vector. Coordinate values of each space-frequency basis vector in the three-dimensional coordinate system represent indexes of the space-frequency basis vector. Any two of space-frequency basis vectors marked as a same shadow (for example, a grid shadow or a black shadow) in (a) in FIG. 6 are orthogonal to each other, and the space-frequency basis vectors form a space-frequency basis vector subset. Space-frequency basis vector subsets indicated by $q_1$, $q_2$, and $q_f$ shown in (a) in FIG. 6 are sets including space-frequency basis vectors marked as grid shadows. Indexes of a space-frequency basis vector subset including space-frequency basis vectors marked as black shadows shown in (a) in FIG. 6 may be $q_1=0$, $q_2=0$, and $q_f=0$. A schematic diagram of a set including space-frequency basis vectors marked as black shadows shown in (a) in FIG. 6 may be shown in (b) in FIG. 6. In FIG. 6, that each of $O_1$, $O_2$, $O_f$, $N_1$, $N_2$ and $N_f$ is 4 is used as an example for description.

Optionally, indexes of each of the L space-frequency basis vectors may include one space domain index and one frequency domain index. It may be understood that a space domain index of a space-frequency basis vector is used to indicate a space domain basis vector for constructing the space-frequency basis vector, and a frequency domain index of the space-frequency basis vector is used to indicate a frequency domain basis vector for constructing the space-frequency basis vector.

For example, if the indexes of the $i^{th}$ space-frequency basis vector in the L space-frequency basis vectors are represented as $(m_1^{(i)}, m_2^{(i)}, m_3^{(i)})$, $m_1^{(i)}$ and $m_2^{(i)}$ are jointly used as space domain indexes of the $i^{th}$ space-frequency basis vector, and $m_3^{(i)}$ is used as a frequency domain index of the $i^{th}$ space-frequency basis vector. For another example, if the indexes of the $i^{th}$ space-frequency basis vector in the L space-frequency basis vectors in the space-frequency basis vector set are represented as $(n_1^{(i)}, n_2^{(i)}, n_3^{(i)})$, $n_1^{(i)}$ and $n_2^{(i)}$ are jointly used as space domain indexes of the $i^{th}$ space-frequency basis vector, and $n_3^{(i)}$ is used as a frequency domain index of the $i^{th}$ space-frequency basis vector. For another example, with reference to (a) in FIG. 6, it may be considered that coordinate values of each space-frequency basis vector on the H axis and the V axis are jointly used to represent space domain indexes of the space-frequency basis vector, and a coordinate value on the f axis is used to represent the frequency domain index of the space-frequency basis vector.

Optionally, the indication information may be implemented in any one of the following Manner 1 to Manner 5.

It should be noted that, for ease of description, concepts of a "space domain index set" and a "frequency domain index set" are introduced into a part of the following manners. The space domain index set is a set including a space domain index of each of the L space-frequency basis vectors. The frequency domain index set is a set including a frequency domain index of each of the L space-frequency basis vectors.

In addition, it should be noted that, for ease of description, specific examples in the following manners are all described by using an example in which the L space-frequency basis vectors are selected from a same space-frequency basis vector subset. In addition, a specific example in the following manner is described by using an example in which the space-frequency basis vector subset is shown in (b) in FIG. 6. For ease of description, an example in which a unit length of each coordinate axis in (b) in FIG. 6 is 1 is used for description. Unified description is provided herein, and details are not described below again. It may be understood that, in a specific implementation process, the L space-frequency basis vectors may alternatively be selected from different space-frequency basis vector subsets. Alternatively, the L space-frequency basis vectors may be selected from a space-frequency basis vector set, and for the space-frequency basis vector set, space-frequency basis vector subsets are not distinguished.

Manner 1: The indication information is used to indicate each space domain index in a space domain index set and each frequency domain index in a frequency domain index set.

Manner 1 may be used in any one of the following scenarios: The space domain index set includes one space domain index; or the frequency domain index set includes one frequency domain index; or each space domain index included in the space domain index set corresponds to a same frequency domain index; or each frequency domain index included in the frequency domain index set corresponds to a same space domain index.

That each space domain index corresponds to the same frequency domain index means that quantities of frequency domain indexes corresponding to the space domain indexes are the same, and values of frequency domain indexes corresponding to the space domain indexes are the same. That each frequency domain index corresponds to the same space domain index means that quantities of space domain indexes corresponding to the frequency domain indexes are the same, and values of frequency domain indexes corresponding to the space domain indexes are the same.

In a specific implementation process, the indication information may include each space domain index in the space domain index set and each frequency domain index in the frequency domain index set. Optionally, the indication information may further include at least a quantity of space domain indexes in the space domain index set or a quantity of frequency domain indexes in the frequency domain index set. In this case, for example, a sequence of information included in the indication information may be that "at least a quantity of space domain indexes in the space domain index set or a quantity of frequency domain indexes in the frequency domain index set" are/is followed by "each space domain index in the space domain index set and each frequency domain index in the frequency domain index set". It is clear that, this embodiment of this application is not limited thereto.

It should be noted that at least the quantity of space domain indexes in the space domain index set or the quantity of frequency domain indexes in the frequency domain index set may also be predefined, for example, predefined in a protocol; or may be pre-configured, for example, pre-configured by using RRC signaling or MAC signaling. This is not limited in this embodiment of this application.

In addition, it should be noted that the transmit end device and the receive end device may further predefine a sequence of the space domain index and the frequency domain index that are included in the indication information. For example, it is predefined that the space domain index is before the frequency domain index. For ease of description, the sequence listed in the example is referred to as a first sequence below. In addition, the transmit end device may further pre-configure or configure by using the indication information, the sequence of the space domain index and the frequency domain index for the receive end device. This is not limited in this embodiment of this application.

In Manner 1, the receive end device may not feed back, to the transmit end device, a correspondence between the space domain index and the frequency domain index that are indicated in the indication information. After receiving the indication information, the transmit end device may first obtain, based on at least the quantity of space domain indexes or the quantity of frequency domain indexes (which may be predefined or pre-configured or indicated in the indication information), and the sequence of the space domain index and the frequency domain index, each space domain index and each frequency domain index that are indicated in the indication information, and then traverse and combine each obtained space domain index and each obtained frequency domain index. Specifically, an index of a space-frequency basis vector may be obtained by combining any space domain index and any frequency domain index, each space domain index and each frequency domain index that are indicated in the indication information may be traversed, to obtain indexes that are of the L space-frequency basis vectors and that are indicated by the indication information.

Figure 7:
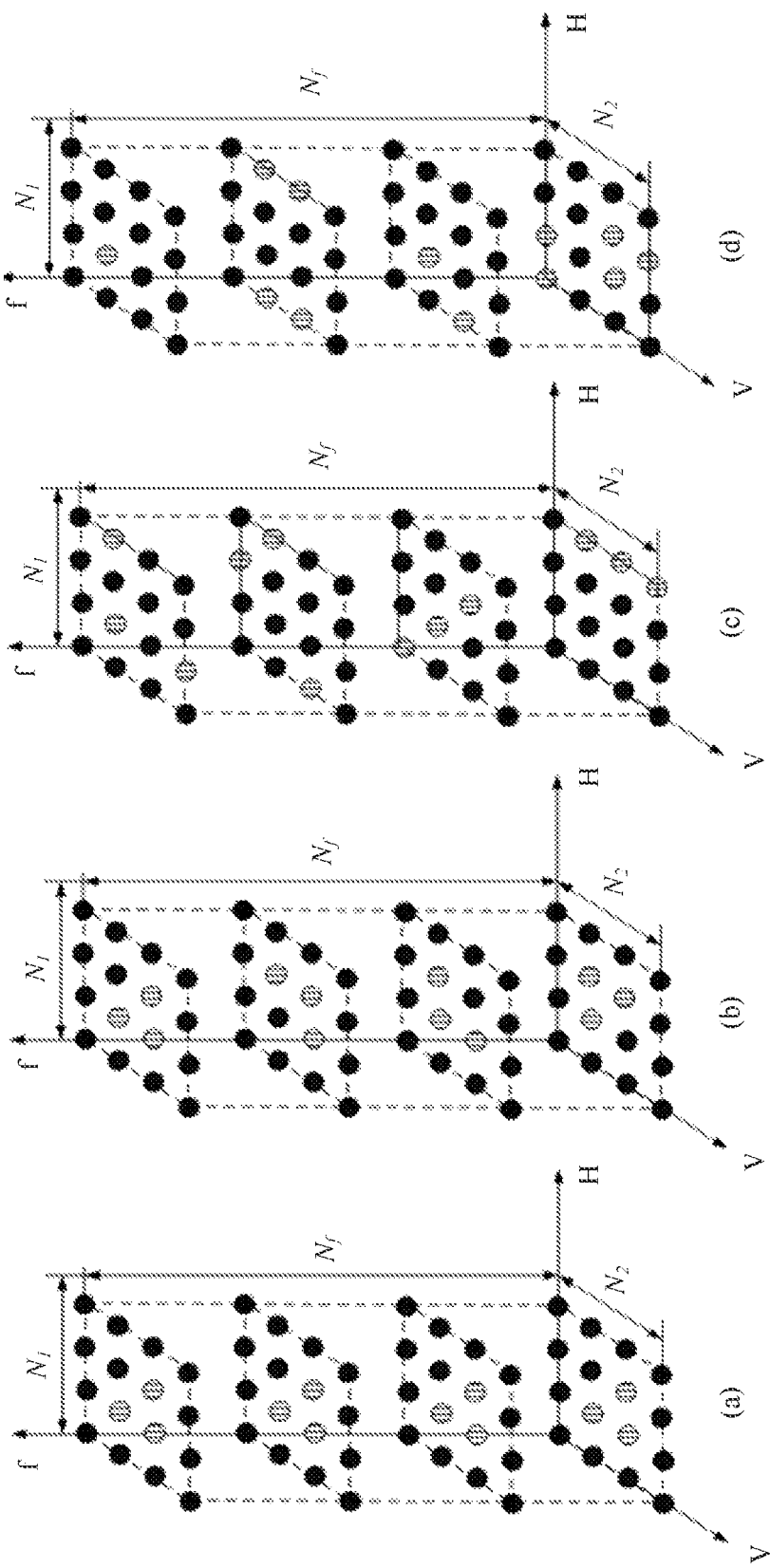
FIG. 7 is a schematic diagram of a space-frequency basis vector fed back by a receive end device according to an embodiment of this application.

For example, it is assumed that L=12, and locations of the 12 space-frequency basis vectors in the three-dimensional coordinate system are shown in (a) in FIG. 7. It can be learned from (a) in FIG. 7 that indexes of the 12 space-frequency basis vectors may be respectively represented as:
(1, 1, 1), (1, 2, 1), (2, 2, 1);
(1, 1, 2), (1, 2, 2), (2, 2, 2);
(1, 1, 3), (1, 2, 3), (2, 2, 3); and
(1, 1, 4), (1, 2, 4), (2, 2, 4).

In the example, the space domain index set is a set including space domain indexes (1, 1), (1, 2), and (2, 2), and the frequency domain index set is a set including frequency domain indexes 1, 2, 3, and 4. In addition, each space domain index corresponds to a same frequency domain index. Therefore, the receive end device may indicate the space domain indexes (1, 1), (1, 2), and (2, 2) and the frequency domain indexes 1, 2, 3, and 4 by using the indication information, to indicate the 12 space domain basis vectors. For example, if the sequence of the space domain index and the frequency domain index is the foregoing first sequence, the indication information may include 1, 1, 1, 2, 2, 2, 1, 2, 3, and 4. Optionally, the indication information may further include at least a quantity (that is, 3) of space domain indexes or a quantity (that is, 4) of frequency domain indexes.

After receiving the indication information, the transmit end device may first obtain, based on at least the quantity (that is, 3) of space domain indexes or the quantity (that is, 4) of frequency domain indexes, and the sequence (that is, the first sequence) of the space domain index and the frequency domain index, each space domain index and each frequency domain index that are indicated in the indication information, and then traverse and combine each obtained space domain index and each obtained frequency domain index. For example, the space domain index (1, 1) and the frequency domain index 1 are combined to obtain an index (1, 1, 1) of a space-frequency basis vector, and the space-frequency basis vector (1, 2) is combined to the frequency domain index 1 to obtain an index (1, 2, 1) of a space-frequency basis vector, . . . , and so on, to obtain indexes of the 12 space-frequency basis vectors.

In an embodiment, the indication information may include an index of the space-frequency basis vector subset from which the L space-frequency basis vectors are selected, each space domain index in the space domain index set, and each frequency domain index in the frequency domain index set. The space domain indexes included in the space domain index set may be L1 space domain indexes selected from $N_1N_2$ space domain indexes by using a combination quantity, and frequency domain indexes included in the frequency domain index set may be L2 frequency domain indexes selected from $N_f$ frequency domain indexes by using the combination quantity, where L=L1L2. Either or both of L1 and L2 may be predefined, or may be configured by the transmit end device for the receive end device by using RRC signaling (or MAC signaling or DCI).

Manner 2: The indication information is used to indicate each space domain index in a space domain index set and a frequency domain index corresponding to the space domain index.

Manner 2 may be used in a scenario in which at least two space domain indexes that are included in the space domain index set correspond to different frequency domain indexes. That at least two space domain indexes that are included in the space domain index set correspond to different frequency domain indexes may include the following: Quantities of frequency domain indexes corresponding to the at least two space domain indexes are different; or quantities of frequency domain indexes corresponding to the at least two space domain indexes are the same, but index values of frequency domain indexes corresponding to the at least two space domain indexes are different.

In a specific implementation process, the indication information may include each space domain index in the space domain index set and a frequency domain index corresponding to the space domain index.

Optionally, the indication information may further include a quantity of frequency domain indexes corresponding to each space domain index. In addition, a quantity of frequency domain indexes corresponding to the space domain index may also be predefined, for example, predefined in a protocol; or may be pre-configured, for example, pre-configured by using the RRC signaling or the MAC signaling.

In an example, quantities of frequency domain indexes corresponding to different space domain indexes are the same. In this case, a quantity of frequency domain indexes corresponding to one space domain index is indicated by using the indication information, or predefined or pre-configured.

In an example, quantities of frequency domain indexes corresponding to different space domain indexes are different. In this case, a quantity of frequency domain indexes corresponding to each space domain index may be indicated by using the indication information, or predefined or pre-configured. For example, a sequence of an $x^{th}$ space domain index included in the indication information and information related to the $x^{th}$ space domain index may be: the $x^{th}$ space domain index, a quantity of frequency domain indexes corresponding to the $x^{th}$ space domain index, and each frequency domain index corresponding to the $x^{th}$ space domain index. It is clear that, this embodiment of this application is not limited thereto. $x \in \{1, 2, \ldots, X\}$, and X is a quantity of space domain indexes in the space domain index set.

It should be noted that the transmit end device and the receive end device may predefine (or pre-configure or indicate by using the indication information) a sequence of the frequency domain index and the space domain index that are included in the indication information. For example, a predefined sequence of the frequency domain index and the space domain index may be: a first space domain index, each frequency domain index corresponding to the first space domain index, a second space domain index, each frequency domain index corresponding to the second space domain index, . . . , the $x^{th}$ space domain index, each frequency domain index corresponding to the $x^{th}$ space domain index, . . . , an $X^{th}$ space domain index, and each frequency domain index corresponding to the $X^{th}$ space domain index. For ease of description, a sequence listed in the example is referred to as a second sequence below. In addition, the transmit end device may further pre-configure or configure by using the indication information, a sequence of the space domain index and the frequency domain index for the receive end device. This is not limited in this embodiment of this application.

In Manner 2, the receive end device needs to feed back, to the transmit end device, a correspondence between the frequency domain index and the space domain index that are included in the indication information. After receiving the indication information, the transmit end device may first obtain, based on the quantity (which may be predefined or pre-configured or indicated by using the indication information) of frequency domain indexes corresponding to each space domain index, the sequence of the frequency domain index and the space domain index, and the correspondence between the space domain index and a frequency domain index that are included in the indication information, each space domain index indicated by the indication information and a frequency domain index corresponding to the space domain index; and then combine each space domain index and the frequency domain index corresponding to the space domain index, to obtain the L space-frequency basis vectors.

For example, it is assumed that L=12, and locations of 12 space-frequency basis vectors in the three-dimensional coordinate system are shown in (b) in FIG. 7. It can be learned from (b) in FIG. 7 that indexes of the 12 space-frequency basis vectors may be respectively represented as:

(1, 1, 1), (1, 1, 2), (1, 1, 4);
(1, 2, 2), (1, 2, 3), (1, 2, 4);
(2, 1, 1), (2, 1, 2), (2, 1, 3); and
(2, 2, 1), (2, 2, 3), (2, 2, 4).

In the example, the space domain index set is a set including space domain indexes (1, 1), (1, 2), (2, 1), and (2, 2), the frequency domain index set is a set including frequency domain indexes 1, 2, 3, and 4, and each space domain index corresponds to different frequency domain indexes. Therefore, the receive end device may indicate the 12 space-frequency basis vectors by using the following information: space domain indexes (1, 1), (1, 2), (2, 1), and (2, 2), frequency domain indexes 1, 2, and 4 corresponding to the space domain index (1, 1), frequency domain indexes 2, 3, and 4 corresponding to the space domain index (1, 2), frequency domain indexes 1, 2, and 3 corresponding to the space domain index (2, 1), and frequency domain indexes 1, 3, and 4 corresponding to the space domain index (2, 2). For example, if the sequence of the space domain index and the frequency domain index is the foregoing second sequence, the indication information may include 1, 1, 1, 2, 4, 1, 2, 2, 3, 4, 2, 1, 1, 2, 3, 2, 2, 1, 3 and 4. Optionally, the indication information may further include a quantity (that is, 3) of frequency domain indexes corresponding to each space domain index.

After receiving the indication information, the transmit end device may first obtain, based on the quantity (that is, 3) of frequency domain indexes corresponding to each space domain index, the sequence (that is, the second sequence) of the space domain index and the frequency domain index, and the correspondence between the space domain index and the frequency domain index that are included in the indication information, space domain indexes (1, 1), (1, 2), (2, 1), and (2, 2), frequency domain indexes 1, 2, and 4 corresponding to the space domain index (1, 1), frequency domain indexes 2, 3, and 4 corresponding to the space domain index (1, 2), frequency domain indexes 1, 2, and 3 corresponding to the space domain index (2, 1), and frequency domain indexes 1, 3, and 4 corresponding to the space domain indexes (2, 2); and then combine each space domain index and a frequency domain index corresponding to the space domain index to obtain 12 space-frequency basis vectors. For example, the space domain index (1, 1) is combined to the frequency domain index 1 to obtain an index (1, 1, 1) of the space-frequency basis vector, and the space domain index (1, 2) is combined to the frequency domain index 2 to obtain an index (1, 2, 2) of the space-frequency basis vector.

Manner 2 may be particularly used in a scenario in which an element included in the frequency domain index set is greater than or equal to an element in the space domain index set. The scenario may be understood as a scenario with a relatively small quantity of space domain indexes (to be specific, space domain sparsity is relatively good).

In an embodiment, the indication information may include an index of the space-frequency basis vector subset from which the L space-frequency basis vectors are selected, each space domain index in the space domain index set, and a frequency domain index corresponding to the space domain index. The space domain indexes included in the space domain index set may be L1 space domain indexes selected from $N_1 N_2$ space domain indexes by using a combination quantity, and frequency domain indexes corresponding to an $a^{th}$ space-frequency index in L1 space-frequency indexes may be $L2_a$ frequency domain indexes selected from $N_f$ frequency domain indexes by using the combination quantity, where $0 \leq a \leq L1-1$, a is an integer, and $L = \sum_{a=0}^{L1-1} L2_a$. Either or both of L1 and $L2_a$ may be predefined, or may be configured by the transmit end device for the receive end device by using RRC signaling (or MAC signaling or DCI).

Manner 3: The indication information is used to indicate each frequency domain index in a frequency domain index set and a space domain index corresponding to the frequency domain index.

Manner 3 may be used in a scenario in which at least two frequency domain indexes that are included in the frequency domain index set correspond to different space domain indexes. That at least two frequency domain indexes that are included in the frequency domain index set correspond to different space domain indexes may include the following: Quantities of space domain indexes corresponding to the at least two frequency domain indexes are different; or quantities of space domain indexes corresponding to the at least two frequency domain indexes are the same, but values of space domain indexes corresponding to the at least two frequency domain indexes are different.

In a specific implementation process, the indication information may include each frequency domain index in the frequency domain index set and a space domain index corresponding to the frequency domain index.

Optionally, the indication information may further include a quantity of space domain indexes corresponding to the frequency domain index. In addition, a quantity of space domain indexes corresponding to the frequency domain index may also be predefined, for example, predefined in a protocol; or may be pre-configured, for example, pre-configured by using the RRC signaling or the MAC signaling.

In an example, quantities of space domain indexes corresponding to different frequency domain indexes are the same. In this case, only a quantity of space domain indexes corresponding to one frequency domain index needs to be predefined or pre-configured.

In an example, quantities of space domain indexes corresponding to different frequency domain indexes are different. In this case, a quantity of space domain indexes corresponding to each frequency domain index may be predefined or pre-configured. For example, a sequence of a $y^{th}$ frequency domain index included in the indication information and related information of the $y^{th}$ frequency domain index may be: the $y^{th}$ frequency domain index, a quantity of space domain indexes corresponding to the $y^{th}$ frequency domain index, and each space domain index corresponding to the $y^{th}$ frequency domain index. It is clear that, this embodiment of this application is not limited thereto. $y \in \{1, 2, \ldots, Y\}$, and Y is a quantity of frequency domain indexes in the frequency domain index set.

It should be noted that the transmit end device and the receive end device may predefine (or pre-configure or indicate by using the indication information) a sequence of the space domain index and the frequency domain index that are included in the indication information. For example, a predefined sequence of the space domain index and the frequency domain index may be a first frequency domain index, each space domain index corresponding to the first frequency domain index, a second frequency domain index, each space domain index corresponding to the second frequency domain index, . . . , the $y^{th}$ frequency domain index, each space domain index corresponding to the $y^{th}$ frequency domain index, . . . , a $Y^{th}$ frequency domain index, and each space domain index corresponding to the $Y^{th}$ frequency domain index. For ease of description, a sequence listed in the example is referred to as a third sequence below. In addition, the transmit end device may further pre-configure or configure by using the indication information, a sequence of the space domain index and the frequency domain index for the receive end device. This is not limited in this embodiment of this application.

In Manner 3, the receive end device needs to feed back, to the transmit end device, a correspondence between the frequency domain index and the space domain index that are included in the indication information. After receiving the indication information, the transmit end device may first obtain, based on the quantity (which may be predefined or pre-configured or indicated by using the indication information) of space domain indexes corresponding to each frequency domain index, the sequence of the space domain index and the frequency domain index, and the correspondence between the frequency domain index and the space domain index that are included in the indication information, each frequency domain index indicated by the indication information and a space domain index corresponding to the frequency domain index; and then combine each frequency domain index and the space domain index corresponding to the frequency domain index, to obtain the L space-frequency basis vectors.

For example, it is assumed that L=12, and locations of 12 space-frequency basis vectors in the three-dimensional coordinate system are shown in (c) in FIG. 7. It can be learned from (c) in FIG. 7 that indexes of the 12 space-frequency basis vectors may be respectively represented as:

(3, 1, 1), (0, 0, 2), (0, 2, 3), (1, 1, 4);
(3, 2, 1), (1, 1, 2), (2, 0, 3), (1, 3, 4); and
(3, 3, 1), (2, 2, 2), (3, 1, 3), (3, 1, 4).

In the example, the space domain index set is a set including space domain indexes (3, 1), (3, 2), (3, 3), (0, 0), (1, 1), (2, 2), (0, 2), (2, 0) and (1, 3), the frequency domain index set is a set including frequency domain indexes 1, 2, 3, and 4, and each frequency domain index corresponds to different space domain indexes. Therefore, the receive end device may indicate the 12 space-frequency basis vectors by using the following information: frequency domain indexes 1, 2, 3, and 4, the space domain indexes (3, 1), (3, 2), and (3, 3) corresponding to the frequency domain index 1, the space domain indexes (0, 0) (1, 1), and (2, 2) corresponding to the frequency domain index 2, the space domain indexes (0, 2), (2, 0), and (3, 1) corresponding to the frequency domain index 3, and the space domain indexes (1, 1), (1, 3), and (3, 1) corresponding to the frequency domain index 4. For example, if a sequence of the space domain index and the frequency domain index is the foregoing third sequence, the indication information may include 1, 3, 1, 3, 2, 3, 3, 2, 0, 1, 1, 2, 2, 3, 0, 2, 2, 0, 3, 1, 4, 1, 1, 1, 2, 2 and 2. Optionally, the indication information may further include a quantity (that is, 3) of space domain indexes corresponding to each frequency domain index.

After receiving the indication information, the transmit end device may first obtain, based on the quantity (that is, 3) of space domain indexes corresponding to each frequency domain index, the sequence (that is, the third sequence) of the space domain index and the frequency domain index, and a correspondence between the frequency domain index and the space domain index that are included in the indication information, frequency domain indexes 1, 2, 3, and 4, space domain indexes (3, 1), (3, 2), and (3, 3) corresponding to the frequency domain index 1, space domain indexes (0, 0), (1, 1), and (2, 2) corresponding to the frequency domain index 2, space domain indexes (0, 2), (2, 0), and (3, 1) corresponding to the frequency domain index 3, and space domain indexes (1, 1), (1, 3), and (3, 1) corresponding to the frequency domain index 4; and then combine each frequency domain index and a space domain index corresponding to the frequency domain index, to obtain indexes of the 12 space-frequency basis vectors. For example, the frequency domain index 1 and the space domain index (3, 1) are combined to obtain an index (3, 1, 1) of a space-frequency basis vector, the frequency domain index 2 and the space domain index (0, 0) are combined to obtain an index (2, 0, 0) of a space-frequency basis vector, and the like.

Manner 3 may be particularly used in a scenario in which an element included in the space domain index set is greater than or equal to an element in the frequency domain index set. The scenario may be understood as a scenario with a relatively small quantity of frequency domain indexes (to be specific, frequency domain sparsity is relatively good).

In an embodiment, the indication information may include an index of the space-frequency basis vector subset from which the L space-frequency basis vectors are selected, each frequency domain index in the frequency domain index set, and a space domain index corresponding to the frequency domain index. The frequency-space domain indexes included in the frequency domain index set may be L2 frequency domain indexes selected from $N_f$ frequency domain indexes by using a combination quantity, and space domain indexes corresponding to a $b^{th}$ frequency domain index in the L2 frequency domain indexes may be $L1_b$ frequency domain indexes selected from $N_1 N_2$ space domain indexes by using the combination quantity, where $0 \leq b \leq L2-1$, and $L=\Sigma_{b=0}^{L2-1} L1_b$. Either or both of L2 and $L1_b$ may be predefined, or may be configured by the transmit end device for the receive end device by using RRC signaling (or MAC signaling or DCI).

Manner 4: The indication information includes an index of a combination that is of the L space-frequency basis vectors and that is in a set including combinations of any L space-frequency basis vectors selected from the space-frequency basis vector set. In other words, the L space-frequency basis vectors may be selected from the space-frequency basis vector set by using the combination quantity.

For example, with reference to the foregoing description, it may be learned that a quantity of space-frequency basis vectors included in the space-frequency basis vector set may be $O_1 N_1 \times O_2 N_2 \times O_f N_f$, a quantity of combinations of any L space-frequency basis vectors selected from the space-frequency basis vector set may be $C_{O_1 N_1 \times O_2 N_2 \times O_f N_f}^{L}$, and a combination of the L space-frequency basis vectors is one of $C_{O_1 N_1 \times O_2 N_2 \times O_f N_f}^{L}$ combinations. In this case, the receive end device and the transmit end device may preset an index corresponding to each combination in the $C_{O_1 N_1 \times O_2 N_2 \times O_f N_f}^{L}$ combinations. Then, in a specific implementation process, the receive end device feeds back the index of the combination of the selected L space-frequency basis vectors by using the indication information.

Manner 4 may be replaced with the following: The indication information includes the index of the space-frequency basis vector subset from which the L space-frequency basis vectors are selected, and an index of a combination that is of L space-frequency basis vectors and that is in a set including combinations of any L space-frequency basis vectors selected from the space-frequency basis vector subset from which the L space-frequency basis vectors are selected. In other words, the L space-frequency basis vectors may be selected from the space-frequency basis vector subset by using the combination quantity.

For example, with reference to the foregoing description, it may be learned that a quantity of space-frequency basis vectors included in the space-frequency basis vector subset from which the L space-frequency basis vectors are selected may be $N_1 \times N_2 \times N_f$. A quantity of combinations of any L space frequency basis vectors selected from the space-frequency basis vector set may be $C_{N_1 \times N_2 \times N_f}^{L}$, and the combination of the L space-frequency basis vectors is one of $C_{N_1 \times N_2 \times N_f}^{L}$ combinations. In this case, the receive end device and the transmit end device may preset an index corresponding to each combination in the $C_{N_1 \times N_2 \times N_f}^{L}$ combinations. Then, in a specific implementation process, the receive end device feeds back, by using the indication information, indexes (for example, values of $q_1$, $q_2$, and $q_f$ described above) of the space-frequency basis vector subset from which the L space-frequency basis vectors are selected, and the index of the combination of the L space-frequency basis vectors.

Manner 5: The indication information includes an index of each of the L space-frequency basis vectors in the space-frequency basis vector set.

For example, with reference to the foregoing description, it may be learned that a quantity of space-frequency basis vectors included in the space-frequency basis vector set may be $O_1N_1 \times O_2N_2 \times O_f N_f$. In this case, the receive end device and the transmit end device may preset an index corresponding to each of the $O_1N_1 \times O_2N_2 \times O_f N_f$ space-frequency basis vectors. Then, in a specific implementation process, the receive end device feeds back the indexes of the selected L space-frequency basis vectors by using the indication information.

Alternatively, the indication information includes the index of the space-frequency basis vector subset from which the L space-frequency basis vectors are selected, and an index of each of the L space-frequency basis vectors in the space-frequency basis vector subset.

Application scenarios of Manner 4 and Manner 5 are general. For example, the solution design indication information provided in Manner 4 or Manner 5 may be used in any scenario in (a) to (d) in FIG. 7. (d) in FIG. 7 is an example in which there is no fixed rule between space domain indexes and frequency domain indexes of the L space-frequency basis vectors.

The foregoing uses one spatial stream as an example for description. The following describes a specific implementation when this embodiment of this application is applied to a scenario of a plurality of spatial streams.

In an implementation, space-frequency component vectors used to construct a precoding vector that is based on each spatial stream are the same.

For example, the space-frequency component vectors used to construct the precoding vector that is based on each spatial stream are all the L space-frequency component vectors described above, and there are two polarization directions. A codebook structure corresponding to R spatial streams (R≥2, and R is an integer) may be shown in Table 1:

TABLE 1

| Spatial stream | Codebook structure (or PMI) |
|---|---|
| First spatial stream | $W^{(1)} = W^1$ |
| Second spatial stream | $W^{(2)} = \frac{1}{\sqrt{2}}[W^1 \ W^2]$ |
| ... | ... |
| $R^{th}$ spatial stream | $W^{(R)} = \frac{1}{\sqrt{R}}[W^1 \ W^2 \ ... \ W^R]$ |

$$W^r = \frac{1}{\sqrt{P}} \begin{bmatrix} \sum_{i=0}^{L-1} p_{r,i} \varphi_{r,i} v^r_{m_1^{(i)}, m_2^{(i)}, m_3^{(i)}} \\ \sum_{i=0}^{L-1} p_{r,i+L} \varphi_{r,i+L} v^r_{m_1^{(i)}, m_2^{(i)}, m_3^{(i)}} \end{bmatrix}, r = 1 \sim R$$

$p_{r,i}$ is an amplitude of a weight of an $i^{th}$ space-frequency component vector in L space-frequency component vectors for constructing a precoding vector that is based on an $r^{th}$ spatial stream, where $0 \leq p_{r,i} \leq 1$. $\varphi_{r,i}$ is a phase of the weight of the $i^{th}$ space-frequency component vector in the L space-frequency component vectors for constructing the precoding vector that is based on the $r^{th}$ spatial stream, where $$\varphi_i \in \left\{ e^{j\frac{2\pi x}{N_{PSK}}}, x = 0 \sim N_{PSK} - 1 \right\}.$$

For descriptions of other parameters, refer to the foregoing description. Details are not described herein again.

In the implementation, the indication information may be used to indicate L space-frequency basis vectors corresponding to the L space-frequency component vectors, and a weight (including an amplitude and a phase of the weight) of each space-frequency component vector for constructing the precoding vector that is based on each spatial stream.

In another implementation, space-frequency component vectors used to construct a precoding vector that is based on each spatial stream are different. Optionally, the component vector used to construct the precoding vector that is based on the $r^{th}$ (r≥2) spatial stream is a part or all of component vectors used to construct the precoding vector that is based on the first spatial stream. In one embodiment, a quantity of component vectors used to construct the precoding vector that is based on the $(r+1)^{th}$ spatial stream (r≥1) is less than or equal to a quantity of component vectors used to construct the precoding vector that is based on the $r^{th}$ spatial stream.

For example, the space-frequency component vectors used to construct the precoding vector that is based on the first spatial stream are all the L space-frequency component vectors described above, and there are two polarization directions. A codebook structure corresponding to R spatial streams (R≥2, and R is an integer) may be shown in Table 2:

TABLE 2

| Spatial stream | Codebook structure (or PMI) |
|---|---|
| First spatial stream | $W^{(1)} = W^1$ |
| Second spatial stream | $W^{(2)} = \frac{1}{\sqrt{2}}[W^1 \ W^2]$ |
| ... | ... |
| $R^{th}$ spatial stream | $W^{(R)} = \frac{1}{\sqrt{R}}[W^1 \ W^2 \ ... \ W^R]$ |

$$W^r = \frac{1}{\sqrt{P}} \begin{bmatrix} \sum_{i=0}^{L(r)-1} p_{r,i} \varphi_{r,i} v^r_{m_1^{(i)}, m_2^{(i)}, m_3^{(i)}} \\ \sum_{i=0}^{L(r)-1} p_{r,i+L} \varphi_{r,i+L} v^r_{m_1^{(i)}, m_2^{(i)}, m_3^{(i)}} \end{bmatrix}, r = 1 \sim R$$

L(r) is a quantity of space-frequency component vectors used to construct the precoding vector that is based on the $r^{th}$ spatial stream, and $v^r_{m_1^{(i)}, m_2^{(i)}, m_3^{(i)}}$ is the $i^{th}$ space-frequency component vector in L(r) space-frequency component vectors used to construct the precoding vector that is based on the $r^{th}$ spatial stream. For descriptions of other parameters, refer to the foregoing description. Details are not described herein again.

In the implementation, the indication information may be used to indicate L space-frequency basis vectors corresponding to L space-frequency component vectors used to construct the precoding vector that is based on the first spatial stream, L(r) space-frequency basis vectors corresponding to L(r) space-frequency component vectors used to construct the precoding vector that is based on the $r^{th}$ (r≥2) spatial stream, and a weight (including an amplitude and a phase of the weight) of each space-frequency component vector for constructing the precoding vector that is based on each spatial stream.

Figure 8:
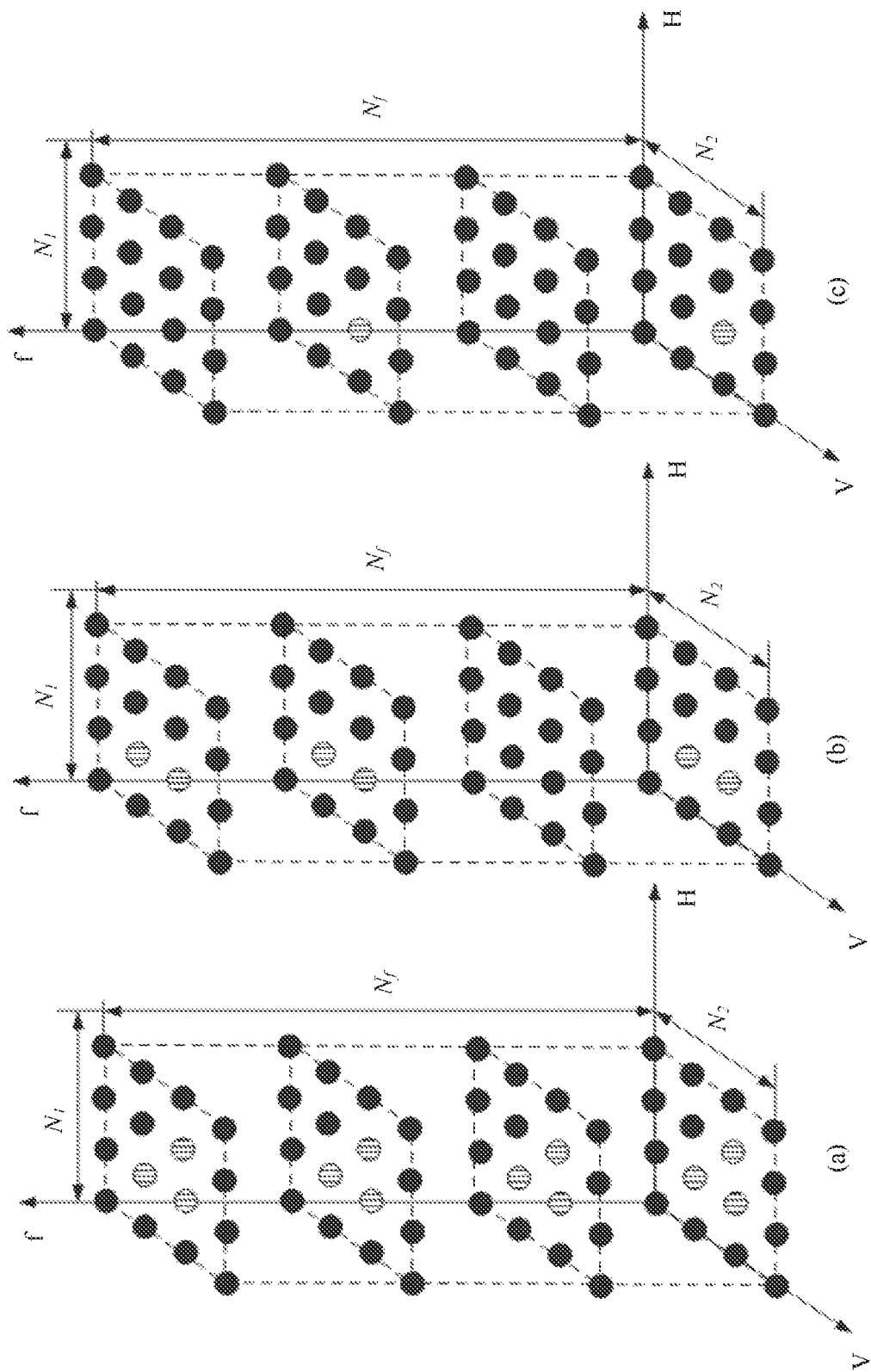
FIG. 8 is a schematic diagram of space-frequency basis vectors that are based on a plurality of spatial streams according to an embodiment of this application.

FIG. 8 is a schematic diagram of a space-frequency basis vector based on a plurality of spatial streams (that is, a space-frequency basis vector corresponding to a space-frequency component vector used to construct precoding vectors of the plurality of spatial streams) according to an embodiment of this application. In FIG. 8, a space-frequency basis vector corresponding to a first spatial stream is: (1, 1, 1), (1, 2, 1), (2, 2, 1); (1, 1, 2), (1, 2, 2), (2, 2, 2); (1, 1, 3), (1, 2, 3), (2, 2, 3); (1, 1, 4), (1, 2, 4), (2, 2, 4), as shown in (a) in FIG. 8. A space-frequency basis vector corresponding to a second spatial stream is (1, 1, 1), (1, 2, 1), (1, 1, 3), (1, 2, 3), (1, 1, 4), (1, 2, 4), as shown in (b) in FIG. 8. A space-frequency basis vector corresponding to a third spatial stream is (1, 2, 1), (1, 2, 3), as shown in (c) in FIG. 8.

The foregoing mainly describes the solutions provided in the embodiments of this application from a perspective of the method. To implement the foregoing functions, the encoder and the decoder each include at least a corresponding hardware structure or software module for performing each function. A person skilled in the art should easily be aware that, in combination with units and algorithm operations of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the channel estimation apparatus (including the receive end device and the transmit end device) may be divided into function modules based on the foregoing method examples. For example, function modules may be divided by using corresponding functions, or two or more functions may be integrated into one processing module. The integrated module may be implemented in a form of hardware, or may be implemented in a form of a software functional module. It should be noted that, in this embodiment of this application, module division is merely an example, and is merely a logical function division. In actual implementation, another division manner may be used.

Figure 9:
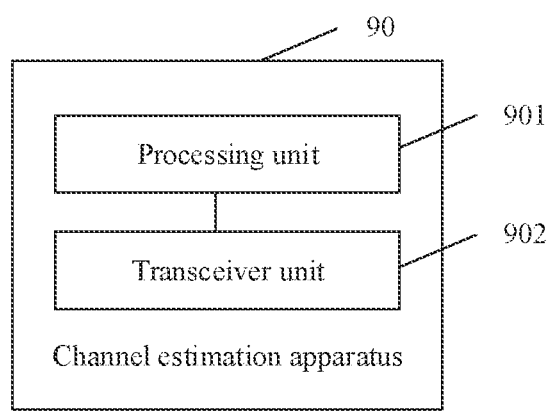
FIG. 9 is a schematic structural diagram of a channel estimation apparatus according to an embodiment of this application.

FIG. 9 is a schematic diagram of a channel estimation apparatus according to an embodiment of this application. The channel estimation apparatus 90 shown in FIG. 9 may be configured to perform the operations performed by the receive end device in the channel estimation method shown in FIG. 4 or FIG. 5, or may be configured to perform the operations performed by the transmit end device in the channel estimation method shown in FIG. 4 or FIG. 5.

The channel estimation apparatus 90 may include a processing unit 901 and a transceiver unit 902.

In some embodiments of this application, the processing unit 901 may be configured to generate indication information, where the indication information is used to indicate L space-frequency basis vectors for constructing an M×N-dimensional space-frequency vector. The space-frequency vector includes M N-dimensional precoding vectors, each precoding vector is used in one of M frequency bands, and the space-frequency vector is generated by performing a weighted combination on L space-frequency component vectors. Each of the L space-frequency component vectors is a vector including M×N elements that are in one of the L space-frequency basis vectors, and each of the L space-frequency basis vectors is an $N_f \times N$-dimensional vector. The space-frequency basis vector is a three-dimensional over-sampled discrete Fourier transform DFT vector. $L \geq 2$, $N_f \geq M \geq 1$, $N \geq 2$, and L, M, N, and $N_f$ are all integers. The transceiver unit 902 may be configured to send the indication information. For example, with reference to FIG. 4, the channel estimation apparatus 90 may be the receive end device in FIG. 4. The processing unit 901 may be configured to perform S101, and the transceiver unit 902 may be configured to perform S102.

Optionally, the transceiver unit 902 is further configured to receive first configuration information, where the first configuration information is used to configure $N_f$.

Optionally, the transceiver unit 902 is further configured to receive second configuration information, where the second configuration information is used to configure a codebook type in a candidate codebook type set. In this case, the processing unit 901 may be configured to generate the indication information based on the codebook type that is configured by using the second configuration information. For example, with reference to FIG. 5, the channel estimation apparatus 90 may be the receive end device in FIG. 5. The transceiver unit 902 may be configured to perform S100-2, and the processing unit 901 may be configured to perform S101A.

In some embodiments of this application, the transceiver unit 902 may be configured to generate indication information, where the indication information is used to indicate L space-frequency basis vectors for constructing an M×N-dimensional space-frequency vector. The space-frequency vector includes M N-dimensional precoding vectors, each precoding vector is used in one of M frequency bands, and the space-frequency vector is generated by performing a weighted combination on L space-frequency component vectors. Each of the L space-frequency component vectors is a vector including M×N elements that are in one of the L space-frequency basis vectors, and each of the L space-frequency basis vectors is an $N_f \times N$-dimensional vector. The space-frequency basis vector is a three-dimensional over-sampled discrete Fourier transform DFT vector. $L \geq 2$, $N_f \geq M \geq 1$, $N \geq 2$, and L, M, N, and $N_f$ are all integers. The processing unit 901 may be configured to determine the L space-frequency basis vectors based on the indication information. For example, with reference to FIG. 4, the channel estimation apparatus 90 may be the transmit end device in FIG. 4. The transceiver unit 902 may be configured to perform S103, and the processing unit 901 may be configured to perform S104.

Optionally, the transceiver unit 902 is further configured to send first configuration information, where the first configuration information is used to configure $N_f$.

Optionally, the transceiver unit 902 is further configured to send second configuration information, where the second configuration information is used to configure a codebook type in a candidate codebook type set; and indication information is generated based on the codebook type that is configured by using the second configuration information. For example, with reference to FIG. 5, the channel estimation apparatus 90 may be the transmit end device in FIG. 5. The transceiver unit 902 may be configured to perform S100-1.

For explanations of related content (for example, the indication information and the first configuration information) and descriptions of beneficial effects in this embodiment, refer to the foregoing method embodiments. Details are not described herein again.

In an example, with reference to the communications device shown in FIG. 2, the processing unit 901 may correspond to the processor 201 or the processor 207 in FIG. 2. The transceiver unit 902 may correspond to the communications interface 204 in FIG. 2.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer-executable instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another operation, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that, various modifications and combinations may be made to them without departing from the scope of this application. Correspondingly, the specification and accompanying drawings are merely example description of this application defined by the accompanying claims, and is considered as any of or all modifications, variations, combinations or equivalents that cover the scope of this application. It is clear that, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A channel estimation method, comprising:
generating indication information, wherein the indication information indicates L space-frequency basis vectors for constructing an M×N-dimensional space-frequency vector; the space-frequency vector comprises M N-dimensional precoding vectors, each precoding vector is used in one of M frequency bands, and the space-frequency vector is generated by performing a weighted combination on L space-frequency component vectors; each of the L space-frequency component vectors is a vector comprising M×N elements that are in one of the L space-frequency basis vectors, and each of the L space-frequency basis vectors is a $N_f$×N-dimensional vector; the space-frequency basis vector is a three-dimensional oversampled discrete Fourier transform (DFT) vector; and L≥2, $N_f$≥M≥1, N≥2, and L, M, N, and $N_f$ are integers; wherein each space-frequency basis vector is selected from a space-frequency basis vector set; the space-frequency basis vector set comprises at least two space-frequency basis vector subsets, and any two space-frequency basis vectors comprised in each space-frequency basis vector subset are orthogonal to each other; and the L space-frequency basis vectors are selected from one of the at least two space-frequency basis vector subsets, and wherein the indication information indicates the space-frequency basis vector subset from which the L space-frequency basis vectors are selected, and wherein the indication information indicates indexes of the L space-frequency basis vectors in the space-frequency basis vector subset; and
sending the indication information.

2. The channel estimation method according to claim 1, wherein
the indication information indicates each space domain index in a space domain index set and each frequency domain index in a frequency domain index set; or
the indication information indicates each space domain index in a space domain index set and a frequency domain index corresponding to the space domain index; or
the indication information indicates each frequency domain index in a frequency domain index set and a space domain index corresponding to the frequency domain index; and
the space domain index set is a set comprising a space domain index of each of the L space-frequency basis vectors, the frequency domain index set is a set comprising a frequency domain index of each of the L space-frequency basis vectors, and indexes of the space-frequency basis vector comprise one space domain index and one frequency domain index.

3. The channel estimation method according to claim 2, wherein
when the indication information indicates each space domain index in the space domain index set and each frequency domain index in the frequency domain index set, the indication information further indicates at least a quantity of space domain indexes comprised in the space domain index set or a quantity of frequency domain indexes comprised in the frequency domain index set; or
when the indication information indicates each space domain index of the L space-frequency basis vectors and the frequency domain index corresponding to the space domain index, the indication information further indicates a quantity of frequency domain indexes corresponding to the space domain index; or when the indication information indicates each frequency domain index of the L space-frequency basis vectors and the space domain index corresponding to the frequency domain index, the indication information further indicates a quantity of space domain indexes corresponding to the frequency domain index.

4. The channel estimation method according to claim 1, wherein
the indication information comprises an index of a combination that is of the L space-frequency basis vectors and that is in a set comprising combinations of L space-frequency basis vectors selected from the space-frequency basis vector set; or
the indication information comprises an index of each of the L space-frequency basis vectors in the space-frequency basis vector set.

5. The channel estimation method according to claim 1, wherein each space-frequency basis vector in the space-frequency basis vector set is a Kronecker product of three vectors, and one of the three vectors is an $N_f$-dimensional vector.

6. The channel estimation method according to claim 5, wherein an element $b_{l,m,s}$ in the space-frequency basis vector set is:

$$b_{l,m,s} = \left[ v_{l,m}^T \quad e^{j\frac{2\pi s}{O_f N_f}} v_{l,m}^T \quad \ldots \quad e^{j\frac{2\pi s(N_f-1)}{O_f N_f}} v_{l,m}^T \right]^T,$$

wherein
$O_f$ is a preset value, both $O_f$ and $N_f$ are positive integers, and $0 \le s \le O_f N_f - 1$;

$$v_{l,m} = \left[ u_m \quad e^{j\frac{2\pi l}{O_1 N_1}} u_m \quad \ldots \quad e^{j\frac{2\pi l(N_1-1)}{O_1 N_1}} u_m \right]^T,$$

wherein
$O_1$ and $N_1$ are preset values, both $O_1$ and $N_1$ are positive integers, and $0 \le l \le O_1 N_1 - 1$; and $$u_m = \begin{cases} \left[ 1 \quad e^{j\frac{2\pi m}{O_2 N_2}} \quad \ldots \quad e^{j\frac{2\pi m(N_2-1)}{O_2 N_2}} \right] & N_2 > 1 \\ 1 & N_2 = 1 \end{cases},$$

wherein both $O_2$ and $N_2$ are positive integers, and $0 \le m \le O_2 N_2 - 1$.

7. The channel estimation method according to claim 6, wherein
$N_f$ is a preset value; or
the method further comprises: receiving first configuration information, wherein the first configuration information is used to configure $N_f$.

8. The channel estimation method according to claim 7, wherein the first configuration information comprises a value of $N_f$; or available bandwidth and a frequency band size; or a length of signaling used to indicate a frequency band location reported in channel state information.

9. The channel estimation method according to claim 1, wherein the method further comprises:
receiving configuration information, wherein the configuration information is used to configure a codebook type in a candidate codebook type set; and
the generating indication information comprises: generating the indication information based on the codebook type that is configured by using the configuration information.

10. A channel estimation apparatus, comprising at least one processor, a transceiver coupled with the at least one processor and configured to communicate with another apparatus, and a non-transitory computer-readable storage medium coupled with the at least one processor and configured to store a program including instructions which, when being executed by the at least one processor, cause the at least one processor to:
generate indication information, wherein the indication information indicates L space-frequency basis vectors for constructing an M×N-dimensional space-frequency vector; the space-frequency vector comprises M N-dimensional precoding vectors, each precoding vector is used in one of M frequency bands, and the space-frequency vector is generated by performing a weighted combination on L space-frequency component vectors; each of the L space-frequency component vectors is a vector comprising M×N elements that are in one of the L space-frequency basis vectors, and each of the L space-frequency basis vectors is a $N_f$×N-dimensional vector; the space-frequency basis vector is a three-dimensional oversampled discrete Fourier transform, DFT, vector; and $L \ge 2$, $N_f \ge M \ge 1$, $N \ge 2$, and L, M, N, and $N_f$ are integers; wherein each space-frequency basis vector is selected from a space-frequency basis vector set; the space-frequency basis vector set comprises at least two space-frequency basis vector subsets, and any two space-frequency basis vectors comprised in each space-frequency basis vector subset are orthogonal to each other; and the L space-frequency basis vectors are selected from one of the at least two space-frequency basis vector subsets, and wherein the indication information indicates the space-frequency basis vector subset from which the L space-frequency basis vectors are selected, and wherein the indication information indicates indexes of the L space-frequency basis vectors in the space-frequency basis vector subset; and
send the indication information.

11. The channel estimation apparatus according to claim 10, wherein
the indication information indicates each space domain index in a space domain index set and each frequency domain index in a frequency domain index set; or
the indication information indicates each space domain index in a space domain index set and a frequency domain index corresponding to the space domain index; or
the indication information indicates each frequency domain index in a frequency domain index set and a space domain index corresponding to the frequency domain index; and
the space domain index set is a set comprising a space domain index of each of the L space-frequency basis vectors, the frequency domain index set is a set comprising a frequency domain index of each of the L space-frequency basis vectors, and indexes of the space-frequency basis vector comprise one space domain index and one frequency domain index.

12. The channel estimation apparatus according to claim 11, wherein
when the indication information indicates each space domain index in the space domain index set and each frequency domain index in the frequency domain index set, the indication information further indicates at least a quantity of space domain indexes comprised in the space domain index set or a quantity of frequency domain indexes comprised in the frequency domain index set; or when the indication information indicates each space domain index of the L space-frequency basis vectors and the frequency domain index corresponding to the space domain index, the indication information further indicates a quantity of frequency domain indexes corresponding to the space domain index; or when the indication information indicates each frequency domain index of the L space-frequency basis vectors and the space domain index corresponding to the frequency domain index, the indication information further indicates a quantity of space domain indexes corresponding to the frequency domain index.

13. The channel estimation apparatus according to claim 10, wherein
the indication information comprises an index of a combination that is of the L space-frequency basis vectors and that is in a set comprising combinations of L space-frequency basis vectors selected from the space-frequency basis vector set; or
the indication information comprises an index of each of the L space-frequency basis vectors in the space-frequency basis vector set.

14. The channel estimation apparatus according to claim 10, wherein each space-frequency basis vector in the space-frequency basis vector set is a Kronecker product of three vectors, and one of the three vectors is an $N_f$-dimensional vector.

15. The channel estimation apparatus according to claim 14, wherein an element $b_{l,m,s}$ in the space-frequency basis vector set is:

$$b_{l,m,s} = \left[ v_{l,m}^T \quad e^{j\frac{2\pi s}{O_f N_f}} v_{l,m}^T \quad \ldots \quad e^{j\frac{2\pi s(N_f-1)}{O_f N_f}} v_{l,m}^T \right]^T,$$

wherein
$O_f$ is a preset value, both $O_f$ and $N_f$ are positive integers, and $0 \leq s \leq O_f N_f - 1$;

$$v_{l,m} = \left[ u_m \quad e^{j\frac{2\pi l}{O_1 N_1}} u_m \quad \ldots \quad e^{j\frac{2\pi l(N_1-1)}{O_1 N_1}} u_m \right]^T,$$

wherein
$O_1$ and $N_1$ are preset values, both $O_1$ and $N_1$ are positive integers, and $0 \leq l \leq O_1 N_1 - 1$; and $$u_m = \begin{cases} \left[ 1 \quad e^{j\frac{2\pi m}{O_2 N_2}} \quad \ldots \quad e^{j\frac{2\pi m(N_2-1)}{O_2 N_2}} \right] & N_2 > 1 \\ 1 & N_2 = 1 \end{cases},$$

wherein
both $O_2$ and $N_2$ are positive integers, and $0 \leq m \leq O_2 N_2 - 1$.

16. The channel estimation apparatus according to claim 15, wherein
$N_f$ is a preset value; or
the instructions further cause the at least one processor to receive first configuration information, wherein the first configuration information is used to configure $N_f$.

17. The channel estimation apparatus according to claim 16, wherein the first configuration information comprises a value of $N_f$; or available bandwidth and a frequency band size; or a length of signaling used to indicate a frequency band location reported in channel state information.

18. The channel estimation apparatus according to claim 10, wherein
the instructions further cause the at least one processor to receive configuration information, wherein the configuration information is used to configure a codebook type in a candidate codebook type set; and
generate the indication information based on the codebook type that is configured by using the configuration information.

19. A non-transitory computer-readable storage medium, comprising program code, wherein the program code comprises an instruction used to perform operations comprising:
generating indication information, wherein the indication information indicates L space-frequency basis vectors for constructing an M×N-dimensional space-frequency vector; the space-frequency vector comprises M N-dimensional precoding vectors, each precoding vector is used in one of M frequency bands, and the space-frequency vector is generated by performing a weighted combination on L space-frequency component vectors; each of the L space-frequency component vectors is a vector comprising M×N elements that are in one of the L space-frequency basis vectors, and each of the L space-frequency basis vectors is a $N_f$×N-dimensional vector; the space-frequency basis vector is a three-dimensional oversampled discrete Fourier transform (DFT) vector; and L≥2, $N_f$≥M≥1, N≥2, and L, M, N, and $N_f$ are integers; wherein each space-frequency basis vector is selected from a space-frequency basis vector set; the space-frequency basis vector set comprises at least two space-frequency basis vector subsets, and any two space-frequency basis vectors comprised in each space-frequency basis vector subset are orthogonal to each other; and the L space-frequency basis vectors are selected from one of the at least two space-frequency basis vector subsets, and wherein the indication information indicates the space-frequency basis vector subset from which the L space-frequency basis vectors are selected, and wherein the indication information indicates indexes of the L space-frequency basis vectors in the space-frequency basis vector subset; and
sending the indication information.

20. A communications chip, wherein the communications chip stores an instruction; and when the instruction is run on a network device or a terminal, the network device or the terminal is enabled to perform operations comprising:
generating indication information, wherein the indication information indicates L space-frequency basis vectors for constructing an M×N-dimensional space-frequency vector; the space-frequency vector comprises M N-dimensional precoding vectors, each precoding vector is used in one of M frequency bands, and the space-frequency vector is generated by performing a weighted combination on L space-frequency component vectors; each of the L space-frequency component vectors is a vector comprising M×N elements that are in one of the L space-frequency basis vectors, and each of the L space-frequency basis vectors is a $N_f$×N-dimensional vector; the space-frequency basis vector is a three-dimensional oversampled discrete Fourier transform (DFT) vector; and L≥2, $N_f$≥M≥1, N≥2, and L, M, N, and $N_f$ are integers; wherein each space-frequency basis vector is selected from a space-frequency basis vector set; the space-frequency basis vector set comprises at least two space-frequency basis vector subsets, and any two space-frequency basis vectors comprised in each space-frequency basis vector subset are orthogonal to each other; and the L space-frequency basis vectors are selected from one of the at least two space-frequency basis vector subsets, and wherein the indication information indicates the space-frequency basis vector subset from which the L space-frequency basis vectors are selected, and wherein the indication information indicates indexes of the L space-frequency basis vectors in the space-frequency basis vector subset; and sending the indication information.

* * * * *